(12) United States Patent
Okuda

(10) Patent No.: US 8,711,754 B2
(45) Date of Patent: Apr. 29, 2014

(54) BASE STATION, RELAY STATION, AND BANDWIDTH ALLOCATION METHOD

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 12/078,649

(22) Filed: Apr. 2, 2008

(65) Prior Publication Data

US 2010/0027457 A1  Feb. 4, 2010

(30) Foreign Application Priority Data

Apr. 12, 2007  (JP) .................................. 2007-104996

(51) Int. Cl.
*H05B 7/14* (2006.01)

(52) U.S. Cl.
USPC ........................................................ 370/315

(58) Field of Classification Search
USPC ........................................................ 370/315
See application file for complete search history.

(56) References Cited

U.S. PATENT DOCUMENTS

| | | | |
|---|---|---|---|
| 5,956,639 A * | 9/1999 | Armbruster et al. | 455/431 |
| 2005/0048914 A1 | 3/2005 | Sartori et al. | |
| 2006/0281404 A1 | 12/2006 | Lee et al. | |
| 2008/0043668 A1* | 2/2008 | Chen et al. | 370/329 |
| 2008/0117854 A1* | 5/2008 | Saifullah et al. | 370/315 |
| 2008/0259857 A1 | 10/2008 | Zheng | |

FOREIGN PATENT DOCUMENTS

| | | |
|---|---|---|
| CN | 1941666 | 4/2007 |
| EP | 1734774 | 12/2006 |
| EP | 1773091 | 4/2007 |
| JP | 2004-172719 | 6/2004 |
| JP | 2006352338 | 12/2006 |
| JP | 2008-017069 | 1/2008 |
| KR | 2002-0041813 | 6/2002 |
| KR | 2006-0129807 | 12/2006 |
| WO | 01/24436 | 4/2001 |

OTHER PUBLICATIONS 802.16 -2004; IEEE Standard for Local and metropolitan area networks; Part 16: Air Interface for fixed Broadband Wireless Access Systems.
802.16e-2005; IEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1.
European Search Report dated Aug. 1, 2008 for corresponding European Patent application 08153585.8-2416.
Liu Erwu, et al. "Performance Evaluation of Bandwidth Allocation in 802.16j Mobile Multi-Hop Relay Networks", Vehicular Technology Conference, 2007; Apr. 1, 2007; pp. 939-943.

(Continued)

*Primary Examiner* — Shripal Khajuria
(74) *Attorney, Agent, or Firm* — Myers Wolin, LLC

(57) ABSTRACT

A relay station that performs relay processing of data, intervening between a wireless terminal and a wireless base station having a receiving processing unit to obtain a bandwidth request included in the data received from the wireless terminal and a bandwidth allocation control unit to allocate a bandwidth to the wireless terminal based on the bandwidth request obtained by the receiving processing unit is utilized in an aspect.

10 Claims, 27 Drawing Sheets

(56) References Cited

OTHER PUBLICATIONS

Zhu P., et al. "802.16j (Mobile Multihop Relay) Technical Requirements" Internet Citation, [Online] Jul. 1, 2006, XP002465373, Retrieved from the internet: URL:http://wirelessman.org/relay/contrib/> [retreived on Jan. 18, 2008].

European Patent Office Communication pursuant to Article 94(3) EPC for corresponding European Patent Application No. 08 153 585.8-2416, issued May 7, 2009.

IEEE C802.16j-06/046 "Broadband Wireless Access Working Group," Jul. 1, 2006, "802.16j (Mobile Multihop Relay) Technical Requirements."

European Patent Office "Communication" issued for corresponding European Patent Application No. 09166877.2, dated Mar. 7, 2011.

English translation of "Notification of Reasons for Refusal" issued by the Japanese Patent Office in an Office Action corresponding to Japanese Patent Application No. 2007104996 dispatched Sep. 13, 2011.

Notification of Reason(s) for Refusal issued for corresponding Japanese Patent Application No. 2011-249150, dispatched Jan. 29, 2013, with English translation.

2nd Notification of Office Action issued on May 14, 2012 for corresponding Chinese Patent Application No. 200810092437.7 with full English translation.

Dong Jun, "A dissertation for the master's degree": Research on QoS Technology of Data Services in HFC Network, Database of All China Outstanding Dissertations for Master's Degrees, Collections of Infromatics, Nov. 15, 2005, pp. I136-I176 (cited in 2nd Notification of Office Action issued for corresponding Chinese Patent Application No. 200810092437.7). With English Abstract.

CNOA, Office Action of Chinese Patent Application No. 201110433449.3 dated Nov. 27, 2013 with full translation of the Office Action.

* cited by examiner

FIG. 3

| Field Name | Description |
|---|---|
| HT:Header Type | 0=Generic MAC header<br>1=Bandwidth request header |
| EC:Encryption Control | 0=Payload is not encrypted<br>1=Payload is encrypted |
| CI:CRC Indicator | 1=CRC is included<br>0=No CRC is included |
| EKS:Encryption Key Sequence | The index of the Traffic Encryption Key(TEK) and Initialization Vector used to encrypt the payload. This field is only meaningful if the EC field is set to 1. |
| LEN:Length | PDU Length, including Generic MAC Header and CRC if any. |
| CID:Connection Identifier | - |
| HCS:Header Check Sequence | Used to detect header errors |
| Type:subheaders | Indication presence of subheaders<br>#5:Mesh subheader<br>#4:ARQ Feedback Subheader<br>#3:Extended Type<br>#2:Fragmentation Subheader<br>#1:Packing Subheader<br>#0:DL:Fast-Feedback Subheader<br>　　UL:Grant Management Subheader |

FIG. 5

| Field Name | Description |
|---|---|
| SI (Slip Indicator) | 0:No Action<br>1:Transmitted by SS when SF transmit queue exceeds threshold. |
| PM (Poll-Me) | 0:No Action<br>1:Requesting Bandwidth Poll for other CID |
| FLI (Frame Latency Indication) | 0=Frame latency field disabled for this grant<br>1=Frame latency field enabled for this grant |
| FL (Frame Latency) | The number of frames previous to the current one in which the transmitted data was available. When the latency is greater than 15 then the FL field shall be set to 15. |
| Piggyback Request | Uplink Bandwidth (Number of Bytes) requested by the SS. Incremental Request. |

FIG. 7

| Field Name | Description |
|---|---|
| HT:Header Type | 1=Bandwidth request header |
| EC:Encryption Control | 0=Payload is not encrypted |
| Type | Bandwidth Request Type<br>000:incremental (BANDWIDTH)<br>001:aggregate (BANDWIDTH) |
| BR:Bandwidth Request | The number of bytes of uplink bandwidth requested by the SS. The request shall not include any PHY overhead. |
| CID:Connection Identifier | Requesting Connection ID. |
| HCS:Header Check Sequence | Used to detect header errors |

FIG. 20

| CID | REQUESTED BANDWIDTH (BYTE) |
|---|---|
| #1 | 1000 |
| #2 | 2000 |
| ... | ... |

FIG. 25

| CID | REQUESTED BANDWIDTH (BYTE) | UNKNOWN BANDWIDTH REQUEST FLAG | PACKET NUMBER |
|---|---|---|---|
| #1 | 1000 | 0 | 356 |
| #2 | 2000 | 1 | 238 |
| ... | ... | ... | ... |

…

BASE STATION, RELAY STATION, AND BANDWIDTH ALLOCATION METHOD

CROSS-REFERENCE TO RELATED APPLICATIONS

This application is related to and claims priority to Japanese Application No. 2007-104996 filed Apr. 12, 2007 in the Japanese Patent Office, the contents of which are incorporated by reference herein.

BACKGROUND

1. Field of the Invention

The present invention relates to a wireless base station, a relay station, and a bandwidth allocation method. The present invention is suitably used for a wireless communication system which is obtained by introducing the relay station to the wireless communication system specified in IEEE 802.16.

2. Description of the Related Art

At present, wireless communication systems utilizing wireless communication paths for communication, such as WCDMA and CDMA2000 as a representative of systems, are in widespread use all over the world. The wireless communication system described above is provided with a plurality of wireless base stations, and a wireless terminal performs communication with other communication apparatus (a communication terminal) through any of the wireless base stations. If the wireless terminal comes close to an edge of a service area of the wireless base station which has started the communication, the wireless terminal can maintain the communication by performing a handover of wireless terminals in adjacent areas.

For example, technologies such as code division multiplex, time division multiplex, and orthogonal frequency division multiplex (OFDM and OFDMA, etc.) are employed for a wireless communication method. Thus, in general, a plurality of the wireless base stations can be connected to one base station simultaneously.

However, high-speed communication may not be possible even if the wireless terminal is in a service area of the wireless base station because a wireless environment is not excellent when the wireless terminal is near a border of the areas. Also, even though the wireless terminal is inside the area, there is a factor disturbing the transmission of wireless signals because of buildings and the like. Thus, there may be an area (a so-called blind zone) in which an excellent wireless connection between the wireless base station and the wireless terminal is difficult.

Therefore, there has been an idea proposed that a relay station is provided inside the service area of the wireless base station such a way that the wireless terminal can communicate wirelessly with the wireless base station through the relay station.

For a task group of 802.16j in particular, introducing the above described relay station (RS: Relay Station) is being discussed at the moment.

The described above matter related to IEEE802.16 is disclosed in, for example, IEEE Std 802.16-2004 and IEEE Std 802.16e-2005.

SUMMARY

According to the above described related art, the wireless terminal can perform the wireless communication with the wireless base station directly or through the relay station. However communication bandwidth allocation control is not described in such system.

Therefore, it is one of objects of the present invention to provide effective communication bandwidth allocation control in such system.

One aspect of the present invention is to provide the relay station with a bandwidth allocation function.

For example, the relay station is provided with a receiving processing unit to obtain a bandwidth request included in the data received from the wireless terminal and a bandwidth allocation control unit to allocate a bandwidth to the wireless terminal based on the bandwidth request obtained by the receiving processing unit.

Another aspect of the present invention is to make it possible that the content of the data ciphered between the wireless terminal and the wireless base station is interpreted in the relay station.

For example, the relay station is provided with a transmitting processing unit to transmit ciphered data received from the wireless terminal to the wireless base station and a receiving processing unit to receive bandwidth request information from the wireless base station, wherein the bandwidth request information is generated by the wireless base station based on a decipher result of the ciphered data.

For example, the wireless base station is provided with a decipher unit to decipher ciphered data received from the relay station and a control unit to control a transmission of bandwidth request information to the relay station, wherein the bandwidth request information is generated based on a deciphered result obtained by the decipher unit.

For example, the relay station is provided with a bandwidth allocation control unit which controls the transmitting unit to transmit allocation information of a predetermined bandwidth to the wireless terminal when the data received from the wireless terminal belongs to a certain connection and when it is detected that a data type included in the data belongs to a predetermined type.

The other aspect of the present invention is to prevent the relay station from performing unnecessary bandwidth allocations.

For example, the relay station is provided with a bandwidth allocation control unit which controls not to perform a bandwidth allocation in a certain circumstance.

BRIEF DESCRIPTION OF THE DRAWINGS

FIG. 3 shows a description of a field in the MAC header.
FIG. 5 shows a description of the field of the grant management subheader.
FIG. 7 shows a description of the field of the bandwidth request header.

FIG. 20 shows a bandwidth request management table.

FIG. 25 shows the bandwidth request management table.

DETAILED DESCRIPTION OF THE PREFERRED EMBODIMENTS

Description is made of examples of the systems and methods, with reference to the figures. Description is made separately for each example for convenience sake. However, combination of the examples is also contemplated.

As a wireless communication system, WiMAX is described as an example. The described systems and methods are also applicable to other mobile wireless communication systems.

[a] Example 1

First, description is made of an example of transfer control of a data packet performed by a relay station. Ciphering of the data packet and deciphering of the cipher are performed between the wireless terminal (occasionally referred to as T or MS) and the wireless base station (BS).

Figure 1:
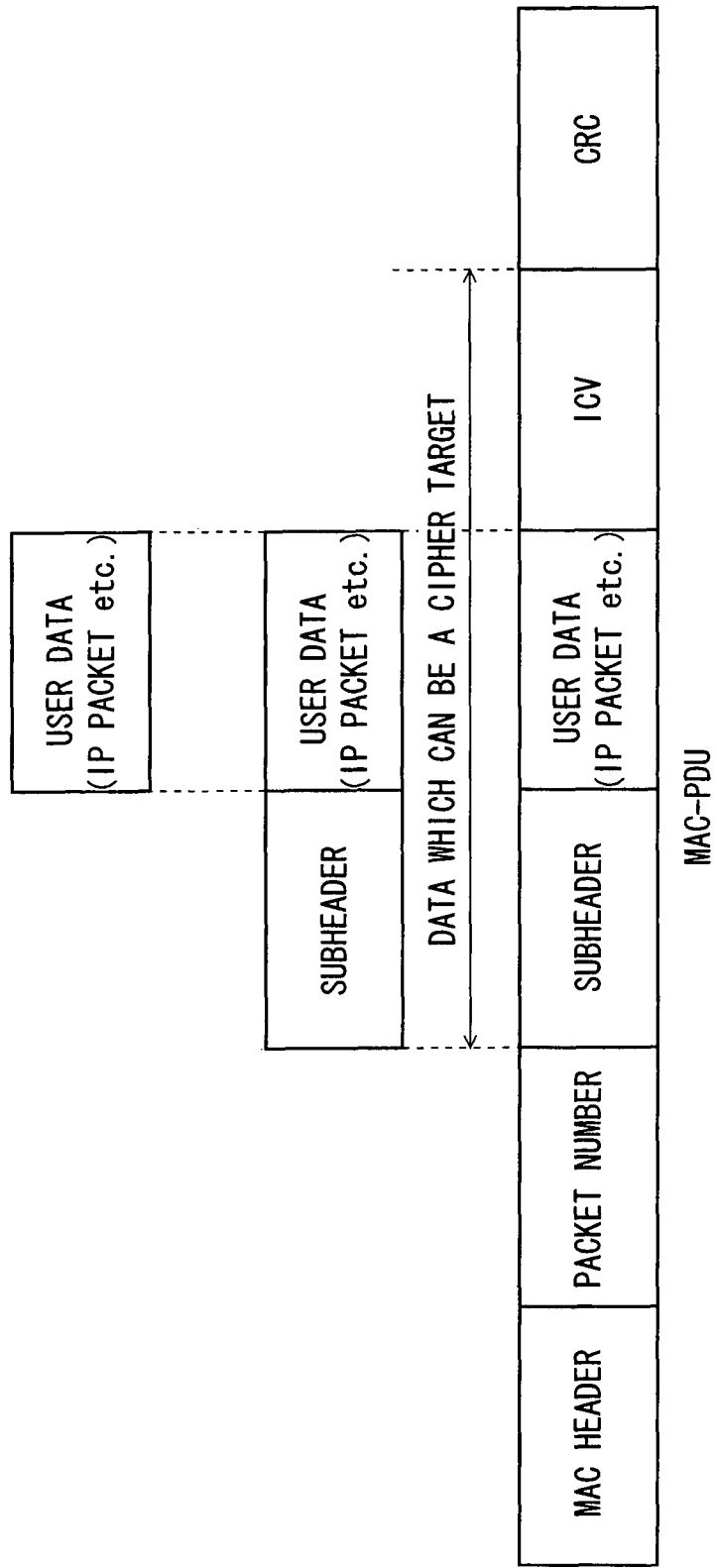
FIG. 1 shows a format of a MAC PDU.

FIG. 1 shows a MAC PDU as an example of data transmitted/received between the wireless base station and the wireless terminal.

User data, such as IP (Internet Protocol) packet, is provided with a subheader. Then cipher processing is performed on the subheader and the user data unit. At this time, a packet number used as a part of a cipher key and an ICV (Integrity Check Value) for securing data integrity are added. The packet number is a number provided in sequence with the packet transmitted from the wireless terminal, and the value increases sequentially. The ICV is an operation result (a hash value) obtained by a hash operation (operation using a one-way function) based on the subheader and the user data which has not been given the cipher processing. A receiving side of the data packet can check a possibility of data falsification depending on whether or not the same hash value can be obtained by the hash operation. Although the packet number is not ciphered, the ICV is ciphered together with the subheader and the user data.

A MAC header and a CRC are added to the ciphered subheader and user data, thereby configuring a MAC PDU. The MAC header includes a connection ID (CID), a Type bit indicating a type of subheader, and the like within a payload. The CRC is a result obtained by a CRC operation performed in a range from a MAC header of a MAC packet to end of a ciphered payload (ICV). At the receiving side, the CRC operation is also performed and thus a hit-error can be detected. That is, the error detection can be performed by using the CRC.

Ciphering can be either applied or not applied with respect to each connection. Incase of the connection in which the ciphering is not applied, the packet number and the ICV may be omitted.

Figure 2:
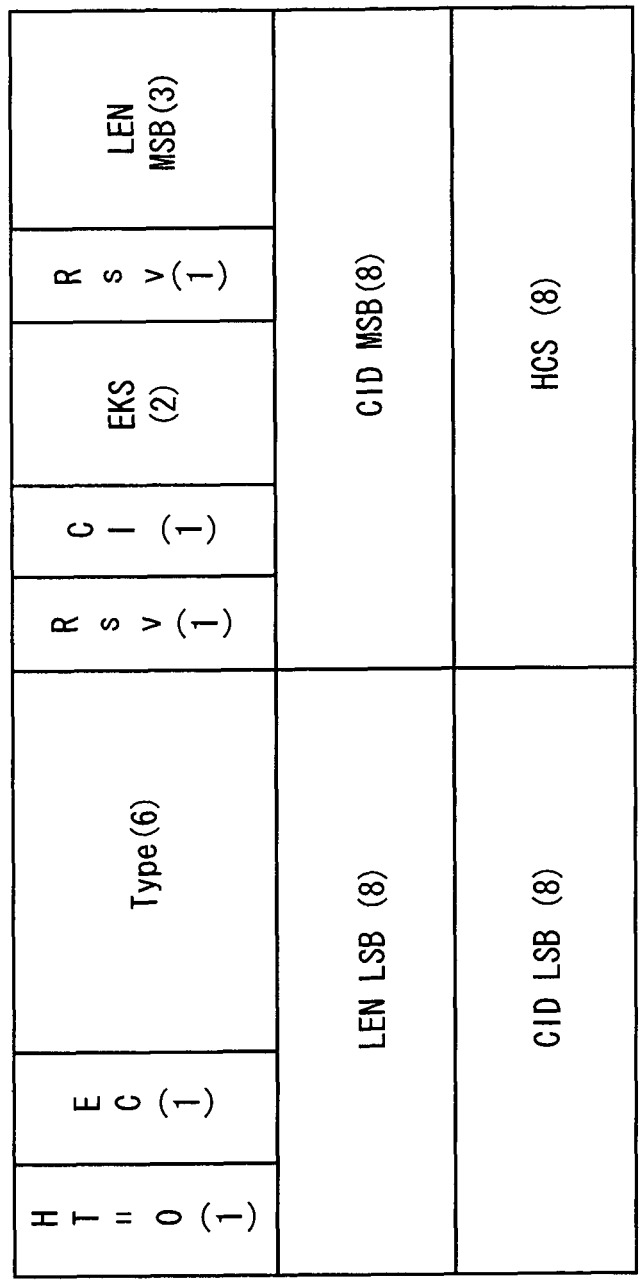
FIG. 2 shows a MAC header.

FIG. 2 shows a detailed content of the MAC header of FIG. 1.

In FIG. 2, the MAC header (occasionally referred to as Generic MAC Header (GMH)) includes a HT, an EC, a Type, an Rev, a CI, an EKS, an Rev, a LEN, a CID, and a HCS field. Numbers in parentheses indicate examples of the number of bits.

FIG. 3 shows a description of each field of the MAC header of FIG. 2.

The HT (Header Type) indicates a type of MAC header. Numeral 0 indicates a generic MAC header. Numeral 1 indicates a bandwidth request header (comprised of, e.g., a MAC header and a CRC without payload).

The EC (Encryption Control) indicates an encryption control (an existence of ciphering) on a payload (a subheader and user data, etc.). Numeral 0 indicates that the payload is not ciphered, and numeral 1 indicates that the payload is ciphered.

The CI indicates a CRC indicator (an existence of a CRC). Numeral 1 indicates that the CRC is included and numeral 0 indicates that the CRC is not included.

The EKS (Encryption Key Sequence) indicates an encryption key sequence showing identification information (index) of a traffic encryption key (TEK). This field becomes available when EC=1. In order to maintain the security strength, the base station and the wireless replace the old TEK with a new TEK before expiration of the old TEK. Therefore, the base station and the wireless terminal may have both the old TEK and the new TEK at the same time. The EKS is the identification information of the TEK used to cipher the payload.

The LEN indicates a PDU length, wherein the PDU includes generic MAC header and CRC.

The CID (Connection ID) indicates a connection ID (Identifier) and is used to identify the communication connection between the base station and the wireless terminal.

The HCS (Header Check Sequence) indicates a header check sequence and is used to detect header errors. That is, the result, in which the 5 bytes in the header excluding the HCS are divided with a generating polynomial (D8+D2+D+1), is inserted into the header as the HCS. At the receiving side, the whole header including the HCS is divided with the above described generating polynomial. If the reminder is other than 0, an existence of a bit error in the header can be detected.

The Type indicates a type of subheader. Numeral #5 indicates a mesh subheader. Numeral #4 indicates an ARQ feedback subheader showing a feedback related to retransmission control. Numeral #3 indicates an extended type. Numeral #2 indicates a fragmentation subheader. Numeral #1 indicates a packing subheader. Numeral #0 indicates a fast feedback subheader showing fast feedback information from the wireless terminal in case of DL and a grant management subheader in case of UL.

The mesh subheader is not a subheader used in a connection mode of a tree structure in which one base station is connected to a plurality of wireless terminals. The mesh subheader is used for communication in the connection mode in which each terminal is mutually connectable.

The fragmentation subheader is a subheader including the sequence number or the like and is added to each MAC PDU when the user data such as the IP packet is divided and transferred as a plurality of the MAC PDUs. The fragmentation subheader is used to reconfigure the original data at the receiving side.

The packing subheader is a subheader including a sequence number and is added to each user data when a plurality of the user data such as IP packets is combined to be transferred as one MAC PDU.

The extended type specifies a number of bits of a sequence number included the above described fragmentation subheader and the packing subheader. That is, this indicates that if this number of bits is set, the sequence number of 11 bits is used. If not, the sequence number of 3 bits is used.

More detailed description is made of a grant management subheader.

The grant management subheader has different meanings depending on a QoS (Quality of Service) class of CID. The CID can be determined by the CID stored in the MAC header.

The QoS is determined when the wireless terminal or the wireless base station forms a communication connection. For example, as for a DSA-REQ or a DSA-RSP transmitted by the base station when the communication connection is formed, it is determined which QoS class the communication connection belongs to by specifying the QoS class as well as the CID. Therefore, it becomes possible to correspond the CID to the QoS class thereafter.

"Examples of QoS Class"

UGS (Unsolicited Grant Service) Connection

For the communication connection belonging to this QoS class, a predetermined (fixed) bandwidth is periodically allocated even if the wireless terminal does not transmit a bandwidth request. This QoS class is appropriate for communication at a fixed rate, such as voice communication, because the predetermined amount of bandwidth is periodically allocated. The wireless terminal can request bandwidth according to need.

ertPS (Extended Real-Time Polling Service) Connection

Also for the communication connection belonging to this QoS class, the predetermined (fixed) bandwidth is periodically allocated even if the wireless terminal does not transmit a bandwidth request. However, the amount of bandwidth to be allocated can be changed by an extended piggyback request from the wireless terminal. As for this QoS class, the period of allocation of bandwidth is constant, but the amount of each allocation can be changed. Accordingly, this QoS class is appropriate for voice communication etc., supporting audio compression or the like.

Other (rtPS/nrtPS/BE) Connections

Connections of other QoS Classes

The base station performs polling (allocating the bandwidth at least as much as possible to transmit the bandwidth request header described below) on the communication connection belonging to an rtPS (Real-Time Polling Service) for a relatively short period. The base station performs polling on the communication connection belonging to an nrtPS (Non-Real-Time Polling Service) as well as to the rtPS, but the period of polling can be longer than that of the rtPS.

Figure 4:
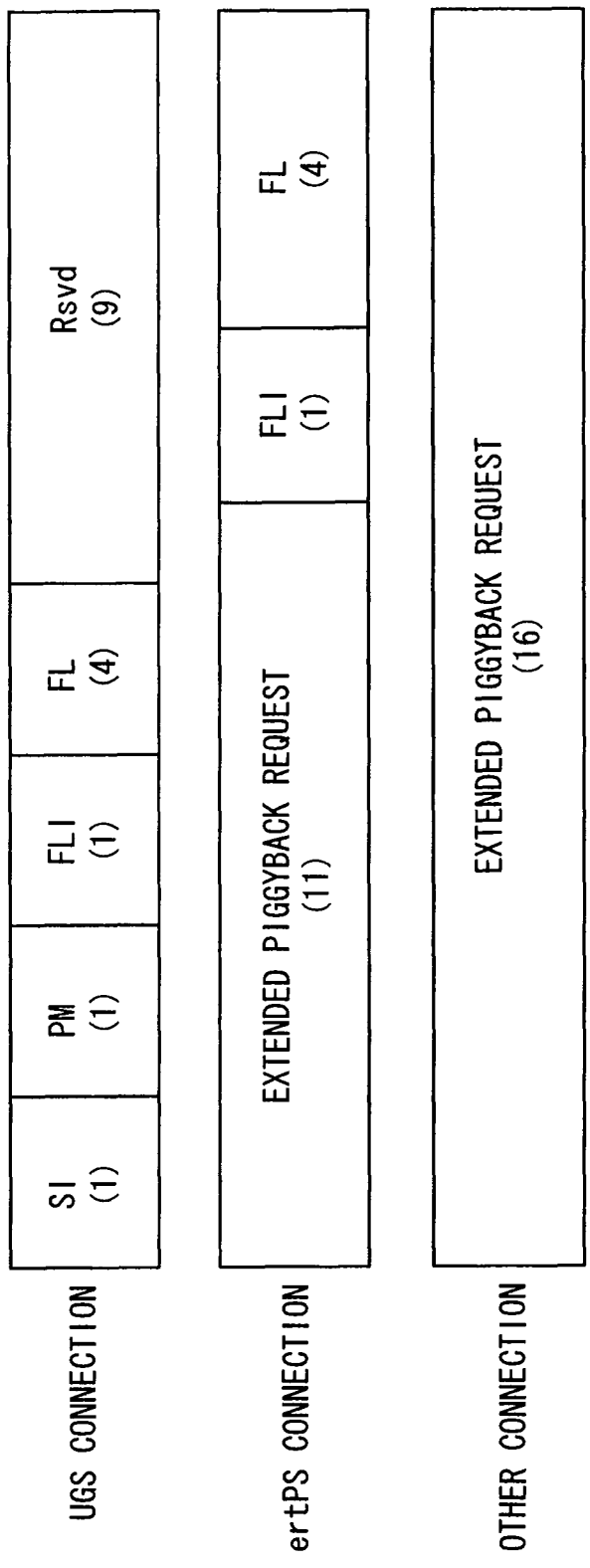
FIG. 4 shows types of a grant management subheader (UL).

FIG. 4 shows a detailed format of the grant management subheader.

Incase of the UGS (Unsolicited Grant Service) connection, the grant management subheader includes a SI, a PM, a FLI, a FL, and a Rsvd. Numbers in the parentheses indicate a number of bits.

Incase of the ertPS (Extended Real-Time Polling Service) connection, the grant management subheader includes the extended piggyback request, the FLI, and the FL.

In case of other connection (rtPS/nrtPS/BE), the grant management subheader includes the extended piggyback request.

FIG. 5 shows a detailed description of the field of the grant management subheader.

The SI (Slip Indicator) indicates a slip indicator. Numeral 0 indicates that there is no action. Numeral 1 indicates that a transmit queue of UGS class exceeds a threshold value. Although the UGS class is a service at a fixed rate, this rate is shared by the base station and the wireless terminal at the time of setting the connection using a DSA-REQ/RSP. However, for example, if the rate is pet to 100 kbps, the data which has to be transmitted to the wireless terminal may be stored in the queue due to a difference between clock accuracies of the wireless terminal and the base station. For this case, the wireless terminal can request the base station to allocate more bandwidth by using this SI bit.

The PM (Poll Me) indicates a poll request. Numeral 0 indicates that there is no action. Numeral 1 indicates that a bandwidth inquiry for other CID is required. For example, when transmission data of BE class is generated at the time of transmitting the connection of UGS class, the wireless terminal can request the bandwidth allocation (polling) for transmission of the bandwidth request header by setting the PM bit.

The FLI indicates whether the frame latency field is disabled or enabled. The FL (Frame Latency) indicates the number of frames previous to the current one in which the transmitted data was available. When the latency is greater than 15 then the FL field is set to 15. For example, in the case of a VoIP (Voice over IP) traffic, data is generated every 20 ms. If there is a difference between a timing of the VoIP data generation and a timing of the bandwidth allocation for UGS, the delay of the transmission queue is large. Accordingly, it is possible to request the base station with the FLI/FL for the bandwidth allocation right after the VoIP traffic is generated.

The piggyback request is an uplink bandwidth (number of bytes) request. The piggyback request indicates an increase request for bandwidth.

On the other hand, the wireless terminal can also use the bandwidth request header with no payload as a method for requesting a bandwidth.

Figure 6:
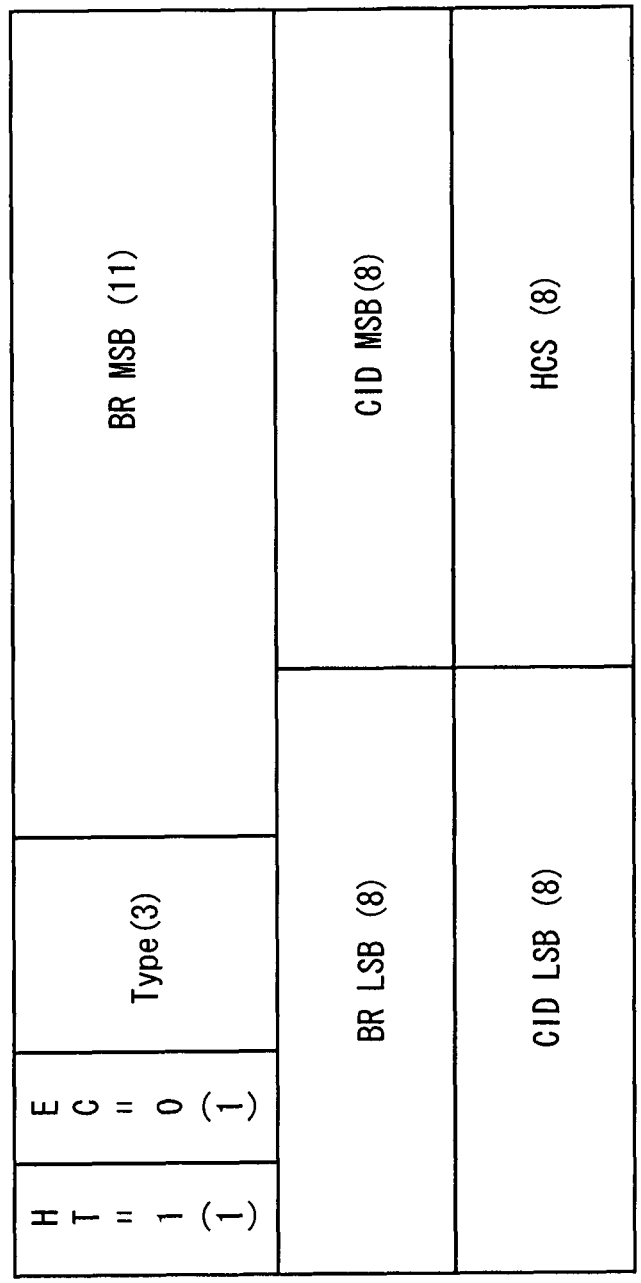
FIG. 6 shows a format of a bandwidth request header.

FIG. 6 shows a bandwidth request header.

As described in FIG. 6, the bandwidth request header includes a HT, an EC, a Type, a BR, a CID, and a HSC. In the bandwidth request header, the HT is set to 1 and the EC is set to 0 (non-ciphered). That is, the bandwidth request header is not ciphered. The payload which was included in the MAC PDU of FIG. 1 is not added to this bandwidth request header.

FIG. 7 shows descriptions of each field of the bandwidth request header.

The Type indicates a type of bandwidth request header. Numeral 000 indicates that the bandwidth requested by a BR is an incremental bandwidth requiring an increase. Numeral 001 indicates that the bandwidth requested by the BR is an aggregate bandwidth requiring a use.

The BR (Bandwidth Request) indicates a bandwidth request indicating a number of bytes of the bandwidth requested by the wireless terminal. At this time, the number of bytes does not include a PHY overhead. That is, the wireless terminal requires the number of bits excluding the PHY overhead because the number of bytes actually transmitted by the rate of an error-correcting code is a different number, and the error-correcting code rate is determined by the base station for use.

The CID is a connection ID and indicates a request connection ID.

The HCS is a header check sequence and is used to detect header errors.

As described above, there are two methods for requesting a bandwidth from the wireless terminal. One is a method (referred as to Piggyback Bandwidth Request (PB-BR) for transmitting a grant management subheader (a first bandwidth request) which can be transmitted with the user data. The other one is a method for transmitting the bandwidth request header (a second bandwidth request) requiring no payload. The bandwidth request header is transmitted without being ciphered. In the grant management subheader, the connection having a non-ciphered grant management subheader and the connection having a ciphered grant management subheader may be mixed depending on whether the EC of the MAC header is 0 or 1.

"System Configuration"

The above described bandwidth request configuration is given as an example to describe the system configuration, the device configuration, the processing procedure, or the like according to the present embodiment, with reference to the figures.

Figure 8:
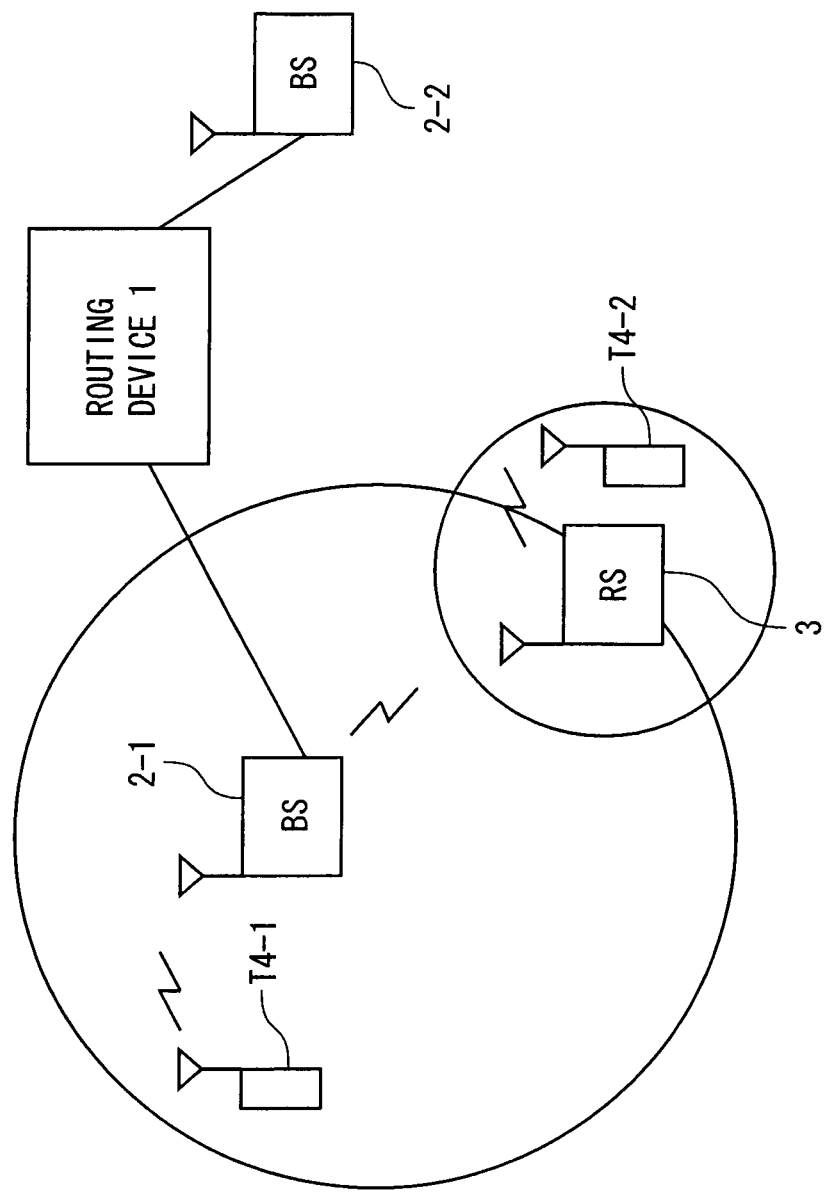
FIG. 8 shows a wireless communication system.

FIG. 8 shows a configuration of the wireless communication system according to the first example. As shown in FIG. 8, numeral 1 indicates a routing device. Numeral 2 indicates a base station (BS). Numeral 3 indicates a relay station (RS). Numeral 4 indicates a wireless terminal (occasionally referred to as T or MS). Either a so-called MS (Mobile Station) which is appropriate for mobile use or a wireless apparatus which is appropriate for immobile use can be used as the wireless terminal 4.

The wireless terminal 4 can perform wireless communication directly with a wireless base station 2-1 (without routing via the relay station) within an area of the wireless base station 2-1 in the same way as the T4-1. Also, the wireless terminal 4 can perform wireless communication with the wireless base station 2-1 through the relay station 3 in the same way as the T4-2.

With attention being focused on the communication path, the T4-1 is referred to as a wireless terminal under a BS, and the T4-2 is referred to as a wireless terminal under a RS.

One or more of the relay stations 3 is provided within the service area of a wireless base station 2.

The wireless base station 2 is connected to a routing device 1. The wireless base station 2 receives data from the wireless terminal 4 and transmits the data to the routing device 1 and conversely, performs control of transmitting the data received from the routing device 1 to the wireless terminal 4. The routing device 1 is connected to a plurality of the wireless base stations and performs routing in such a way that the data reaches the destination by transmitting the data received from the wireless base station 2 to another routing device or another wireless base station.

Favorably, the wireless base station 2 converts the data into a form of packets and then transmits the data to the routing device. It is preferable to have a database in a network for storing a location registration area (serving area information of a wireless terminal formed by a plurality of wireless base stations), a service configuration, or the like, so that the routing device 1 can obtain this information as necessary at the time of routing.

"wireless Frame Format"

Next, description is made of an example of a wireless format between a wireless base station 2-1, a wireless terminal 4-1, a relay station 3, and a wireless terminal 4-2.

Figure 9:
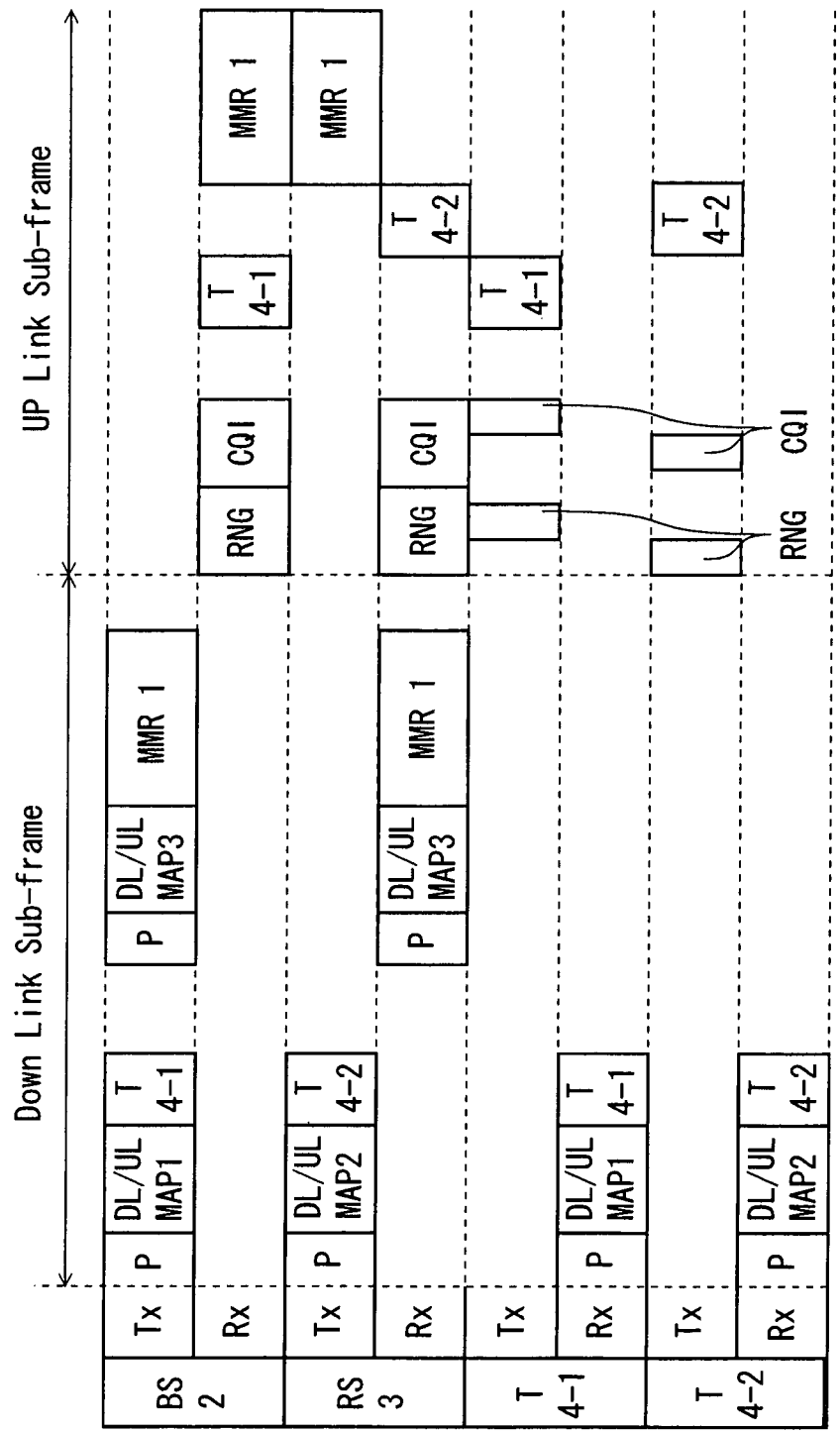
FIG. 9 shows a wireless frame format.

FIG. 9 shows an example of the wireless frame format. In this case, the wireless frame format corresponding to IEEE Std 802.16 d, e is given as an example but the wireless frame format is not limited to this.

In FIG. 9, a TX and an Rx indicate transmitting and receiving, respectively. Accordingly, the BS2 transmits a DL/UL MAP and a downlink burst T4-1 (data transmitted to the wireless terminal 4-1) in series with a preamble (P) in the lead of the frame. Furthermore, the BS2 transmits a DL/UL MAP and a MMR burst 1 (data transmitted from the wireless base station 2 to the relay station 3) to the RS3. In this case, the reason why the MAP is transmitted to the RS3 separately from the MAP transmitted to the MS is that the RS3 transmits the preamble signal, the DL/UL MAP, and the downlink burst T4-2 to the T4-2 at the same timing as the BS2 transmits.

The preamble is a synchronization signal which is transmitted into the area of the wireless base station or the relay station in order to synchronize the wireless terminal 4 with the wireless base station 2 or the relay station 3. In order to maintain the synchronization between the relay station 3 and the wireless base station 2, the wireless base station 2 can transmit other signals similar to the preamble before transmitting the MAP to the relay station 3 or the end of the downlink subframe. The preamble signals are transmitted in a known pattern at a prescribed interval. In FIG. 9, a preamble signal is retransmitted at the beginning of a downlink subframe.

The wireless terminal stores various patterns of preamble signal in advance and thus can select the wireless base station corresponding to the pattern with the most sufficient reception quality (e.g., a receiving level) as the wireless base station of the destination.

For example, when an OFDM (including an OFDMA) is used as a wireless method, the wireless base station assigns the transmission data to each sub carrier in order to transmit the data by using a plurality of the sub carriers. In this case, the preamble signals can be transmitted to each sub carrier in a predetermined pattern. The wireless terminal receives a combination of the predetermined sub carrier for a matching with the known preamble signal and thus can be synchronized with the wireless base station from which the most preferable preamble is received.

The DL/UL MAP (MAP1, 2) follows the transmission of the preamble signal. The DL/UL MAP is an area for storing control data (MAP data) to notify the wireless terminal 4 of a communication parameter for controlling transmit/receive operation such as a transmit/receive timing, a transmit/receive channel, a wireless communication method (a modulation method, an encoding method, or an encoding rate, etc.). The relay station 3 can be notified of similar information by a MAP (MAP3) which is different from the DL/UL MAP 1.

The MAP data includes DL MAP data and UL MAP data. The DL MAP data defines a structure of the downlink sub-frame, and the UL MAP data defines a structure of the uplink sub-frame.

The DL MAP data includes the MAP data (RB (MAP3)) and the MAP data (B (MAP1,2)). The MAP data (RB) is the transmit data which is to be transmitted to the relay station 3 and indicates an area of MMR 1 (a transmit timing, a transmission channel (a receive timing and a reception channel of a receiving device)) and a wireless communication method. The MAP data (B) is the transmit data which is to be transmitted to the wireless terminal 4-1 and indicates an area of the T4-1 (a receive timing and a transmission channel (a receive timing and a reception channel of a receiving device)) and a wireless communication method. The RB and the B also include the identification information (a CID or the like) of the relay station or the wireless terminal as transmit targets, respectively.

On the other hand, the UL MAP data includes the MAP data (B) and the MAP data (RB). The MAP data (B) is the data transmitted to the wireless terminal 4-1 and indicates the area for receiving burst data, an RNG (a ranging signal), a CQI, and a wireless communication method for transmission of the wireless terminal 4-1 (Up link). The MAP data (RB) is the data transmitted to the relay station 3 and indicates the area (a receive timing and a reception channel (a transmit timing and a transmission channel of a transmitting device)) and the wireless communication method for transmission of MMR 1 from the relay station 3 (Up link).

There are various patterns of ranging signal which can be transmitted in an RNG area. Depending on situations, ranging processing is performed by using the ranging signals in the pattern corresponding to the situation.

Initial Ranging Signal

An initial ranging signal is a signal which is transmitted when the wireless terminal needs to perform a network entry. The wireless terminal can conduct the network entry by a successful transmission of the ranging signal. When receiving this signal, the wireless base station 2 requests and transmits a transmission timing shift (a phase shift), a transmission frequency shift, and increase/decrease information of necessary transmission power to the wireless terminal as adjustment information (RNG-RSP (ranging response)).

Periodic Ranging Signal

A periodic ranging signal is a signal which is transmitted periodically to the network by the wireless terminal which has conducted the network entry.

Bandwidth Request Ranging Signal

Figure 10:
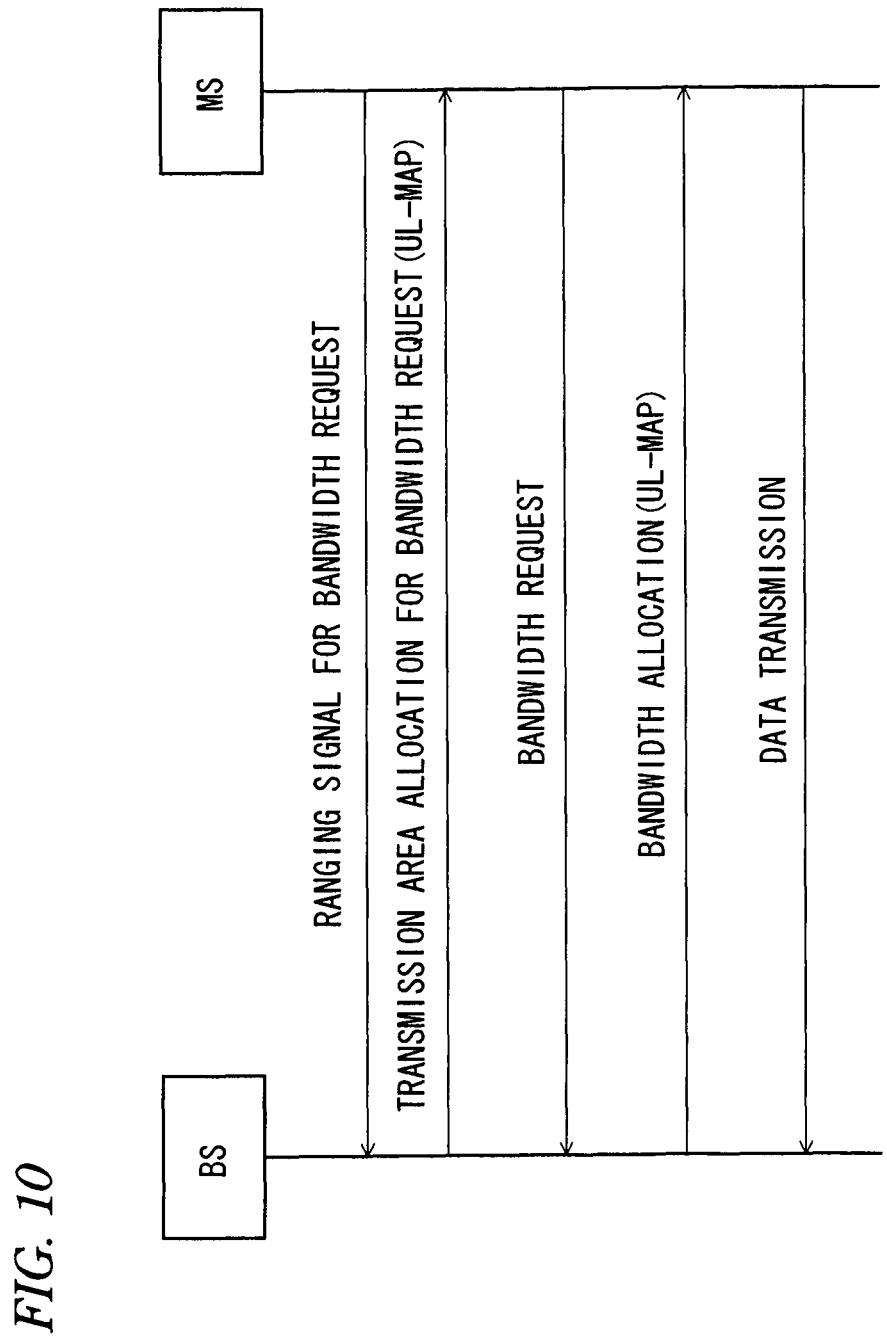
FIG. 10 shows a bandwidth allocation sequence.

A bandwidth request ranging signal is a signal which is transmitted when the wireless terminal requests an uplink bandwidth. When the wireless terminal or the like needs to transmit the data after completing the initial ranging, this signal is transmitted to obtain the transmit bandwidth. That is, the wireless terminal transmits the bandwidth request ranging signal, receives the allocation of the transmission area for performing the bandwidth request, and transmits the bandwidth request header in the transmission area. Then the wireless terminal 4, which is specified the transmission area corresponding to the requested bandwidth by the UL MAP data, performs the transmission of the data in the specified area (see FIG. 10).

Handover Ranging Signal

A handover ranging. signal is a signal transmitted to the wireless base station of the handover destination and performs the same processing as that of the initial ranging signal.

The CQI indicates a transmit period in which the wireless terminal can report the result of measuring the reception quality on the known signal such as a preamble or a pilot signal (a known signal included in the downlink burst data). Based on the CQI received from the wireless terminal 4-1 under the BS, the wireless base station 2 controls the transmitting processing unit in order to change the transmit parameter such as a modulating method (64QAM and 16QAM, etc.), an encoding method (convolution encoding and turbo encoding, etc.), and an encoding rate (1/2 and 1/3, etc.). That is, the control is performed in a direction of increasing the speed of the transmission when the reception quality is good. The control is performed in a direction of decreasing the speed of the transmission when the reception quality deteriorates.

As well as the terminal base station 2, the relay station 3 may transmit the preamble, the DL/UL MAP data, and the burst data for the wireless terminal 4-2 under the relay station 3.

At this time, the DL/UL MAP transmitted from the relay station 3 can be generated and controlled by the relay station 3.

The wireless terminal 4-2 under the relay station 3 performs synchronization with the relay station 3 by using the preamble transmitted from the relay station 3, receives the MAP data from the relay station 3, recognizes the transmit/receive timing, and performs transmitting/receiving of the data at the assigned timing. Also, the wireless terminal 4-2 performs transmitting of the ranging signal and the CQI within the RNG and CQI area specified by the UL MAP data received from the relay station 3.

That is, the wireless terminal 4-2 transmits the ranging signals in the pattern corresponding to the situation, measures the reception quality of the known signals such as the preamble received from the relay station 3 or the pilot signal (a known signal included in the downlink data and the like), and reports the measurement result to the relay station 3 or the wireless base station 2 as a CQI. The reported measurement result is used to control the transmitting processing unit in the relay station 3. And, the transmit parameters, such as the modulation method, the encoding method, and the encoding rate, are changed in accordance with the CQI.

In the configuration example of this frame, the period in which the transmission is performed from the BS 2 or the RS 3 to the T and the period in which the transmission is performed from the BS2 to the RS3 are separated in time.

The relay station 3 transmits the data received from the wireless terminal 4-2 to the wireless base station 2 through a MMR link, and conversely, the relay station 3 transmits the data received from the wireless terminal 4-2 to the wireless base station 2 through the MMR link.

"Device Configuration"

Figure 11:
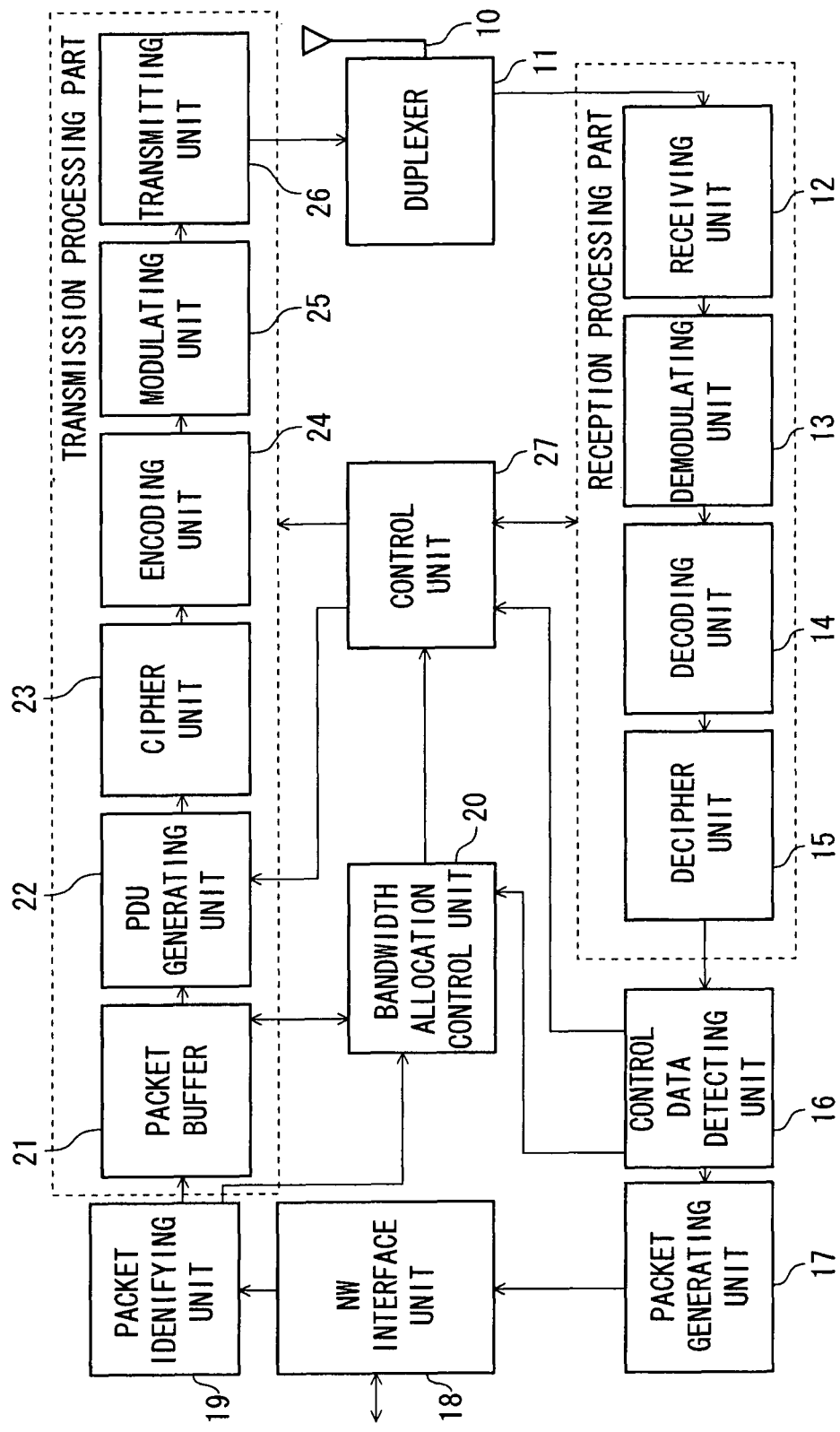
FIG. 11 shows a wireless base station (2).

Next, detailed description is made of a configuration of the wireless base station 2, with reference to FIG. 11.

FIG. 11 is a diagram showing a configuration of the wireless base station 2.

As shown in FIG. 11, numeral 10 indicates an antenna for transmitting/receiving wireless signals between the relay station 3 and the wireless terminal 4. Numeral 11 indicates a duplexer to share the antenna 10 in a transmitting/receiving system. Numeral 12 indicates a receiving unit. Numeral 13 indicates a demodulating unit to demodulate received signals. Numeral 14 indicates a decoding unit to decode the demodulated received signals. Numeral 15 indicates a decipher unit to perform decipher processing on the data (or data portion) ciphered by the wireless terminal 4 and to give the decipher result to a control data detecting unit 16.

The control data detecting unit 16 detects the control data and gives the data related to the bandwidth allocation to a bandwidth allocation control unit 20 and a control unit 27 as well as transfers other data, such as user data, to a packet generating unit 17. Numeral 17 indicates a packet generating unit to packetize the data transferred from the control data detecting unit 16 and gives the packetized data to a NW interface unit 18.

Numeral 18 indicates a network interface unit forming an interface (by which packet communication is performed) for communication to the routing device 1. Numeral 19 indicates a packet identifying unit to identify an IP address included in the packet data received from the NW interface unit 18 and specifies the destination wireless terminal 4 based on the IP address data. For example, by storing IP addresses and corresponding CIDs and searching the corresponding CID by using the identified ID address as a key information. The packet identifying unit 19 also obtains QoS (stored in correspondence with the CID) information corresponding to the CID, gives the CID and the QoS information to the bandwidth allocation unit 20 to perform the bandwidth allocation request; and stores the data received from the NW interface unit 18 in a packet buffer unit 21.

Numeral 20 indicates a bandwidth allocation control unit 20. Based on the bandwidth allocation request received from the packet identifying unit 19 and the bandwidth allocation request, including the bandwidth allocation request received from the wireless terminal 4-1 without routing the relay station 3, obtained from the control data detecting unit, the bandwidth allocation control unit 20 performs the transmission of the MAP data by generating and giving the MAP data to the packet buffer unit 21.

Numeral 22 indicates a PDU generating unit. The MAP data and the transmit data (MAC PDU) are generated to be stored in each area of the wireless frame which is formed based on the synchronization signal (preamble), and then are transmitted to a cipher unit 23. That is, the PDU generating unit 22 adds a MAC header, a packet number, a subheader, an ICV, a CRC, or the like to the user data when needed before outputting the user data.

The cipher unit 23 performs the cipher processing on the payload (a subheader, user data, and an ICV) part when the EC of the MAP header is 1 and gives the result to an encoding unit 24. The cipher processing is deemed to be performed by the PDU generating unit 22 and thus can be performed before adding a header or the like.

Numeral 24 indicates an encoding unit. Numeral 25 indicates a modulating unit. Numeral 26 indicates a transmitting unit. By these units, the PDU data is given the encoding processing such as an error-correcting encoding and is modulated in series. The data is transmitted as a wireless signal from the transmitting unit 26 through the antenna 10.

Numeral 27 indicates a control unit. The control unit 27 controls transmit/receive operation by controlling the transmitting processing unit and the receiving processing unit.

When data needs to be transmitted to the relay station 3 through the MMR link, the control unit 27 requests the bandwidth allocation control unit 20 to secure the burst area of the MMR link as well as transmits the data through the MMR link by giving the transmit data (the control data or the like) to the PDU generating unit 22.

On the other hand, the data (the control data and the like) transmitted from the relay station 3 through the MMR link is obtained from the control data detecting unit 16. The content of the data is deciphered, and necessary processing is performed.

Furthermore, the control unit 27 receives the ciphered data from the relay station 3 (e.g., the subheader or the like in the case of setting 0 to the HT of the MAC header, 1 to the EC of the MAC header, and #0 to the type field) via the decipher unit 15 and the control data detecting unit 16. The control unit 27 obtains the result of deciphering the ciphered data (the subheader) by the decipher unit 15, and generates bandwidth request information of the wireless terminal 4. The bandwidth request information is the information about the bandwidth requested by the wireless terminal 4. Therefore, the wireless base station 2 transmits the bandwidth request information to the relay station 3 through the MMR link by giving the bandwidth request information, which is the decipher result to the relay station 3, to the PDU generating unit 22. At this time, the control unit 27 requests the bandwidth allocation control unit 20 to secure the data transmission area.

Figure 12:
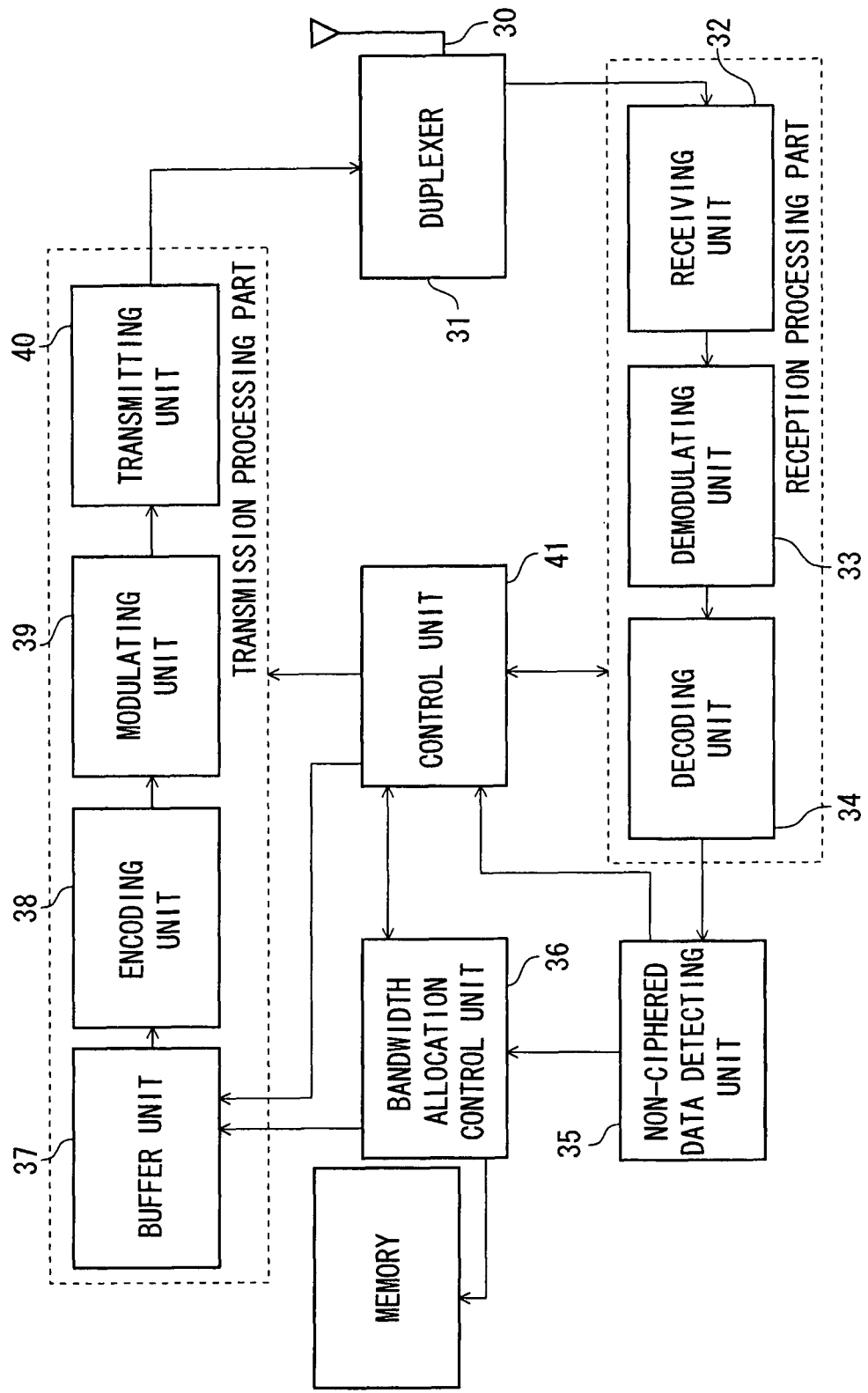
FIG. 12 shows a relay station (3).

FIG. 12 is a diagram showing a configuration of the relay station 3.

In FIG. 12, numeral 30 indicates an antenna for transmitting/receiving wireless signals between the wireless base station 2 and the wireless terminal 4. Numeral 31 indicates a duplexer for sharing the antenna 10 for transmission, and reception. Numeral 32 indicates a receiving unit. Numeral 33 is a demodulating unit to demodulate received signals. Numeral 34 indicates a decoding unit to decode (error-correcting decode) the demodulated received signal. Numeral 35 indicates a detecting unit to detect non-ciphered data of the data received from the wireless base station 2 or the wireless terminal 4.

The non-ciphered data detecting unit 35 detects, for example, a non-ciphered MAC PDU received from the wireless terminal and a non-ciphered MAC header (a bandwidth request header (HT=1, EC=0)) and gives the MAC PDU and the MAC header to a bandwidth allocation control unit 36. The non-ciphered data detecting unit 35 gives the received data to a control unit 41 regardless of whether or not the data is ciphered (the MAP data, the ciphered MAC PDU received from the wireless terminal, other received control data, the non-ciphered MAC PDU, the non-ciphered MAC header, etc.).

The control unit 41 gives the ciphered MAC PDU received from the wireless terminal, other received control data, the non-ciphered MAC PDU, the non-ciphered MAC header to a buffer unit 37 and thus these data are transmitted to the wireless base station 2. At this time, when the bandwidth allocation request is received from the wireless terminal 4-2 if the bandwidth allocation control is possible by the bandwidth allocation control unit 36, the bandwidth allocation request can be controlled not to be transmitted to the wireless base station 2 (e.g., the data indicating this request is not given to the buffer unit 37). Also, it is possible to inform the wireless base station 2 that this request is invalid.

The bandwidth allocation control unit 36 interprets the MAC PDU and the MAC header (the bandwidth request header) which are non-ciphered and interpretable and generates uplink MAP data securing the requested bandwidth. The bandwidth allocation control unit 36 transmits the MAP data to the wireless terminal 4 by giving the MAP data to the buffer 37. Furthermore, the bandwidth allocation control unit 36 obtains the information of the MAC PDU which is to be transmitted to the wireless terminal 4, generates downlink MAP data, gives the downlink MAP to the buffer 37, and transmits the MAP data and the MAC PDU to the wireless terminal 4.

Numeral 37 indicates a buffer unit. The buffer unit 37 stores the transmit data given by the control unit 41 and outputs the stored transmit data to an encoding unit 38 so that the corresponding transmit data is transmitted at the transmit timing defined by the MAP data given by the bandwidth allocation control unit 36. At the time of transmitting the transmit data to the wireless terminal 4-2, the preamble and the MAP data given by the bandwidth allocation control unit 36 are added to the transmit data and then are provided to the encoding unit 38.

The data addressed to the wireless terminal 4 is received through a communication link (a MMR link) formed between the wireless base station 2 and the relay station 3.

Numeral 38 indicates an encoding unit. Numeral 39 indicates a modulating unit. The transmit data from the buffer unit 37 is encoded, modulated and give to a transmitting unit 40 so that the transmitting unit 40 transmits the user data is transmitted at the transmit timing, and on the channel obtained in the bandwidth allocation control unit 36.

Numeral 40 indicates a transmitting unit to transmit a transmit signal to the wireless terminal 4 or the wireless base station 2 through the antenna 30 as wireless signals.

Numeral 41 indicates a control unit. The control unit 41 controls the transmitting processing unit and the receiving processing unit such a way that the MAP data obtained from the wireless base station 2 is interpreted and transmitted/received to/from the wireless base station 2 at the transmit/receive timing, on the channel, and by the wireless communication method. When transmitting the downlink burst to the wireless terminal 4, the control unit 41 controls the transmitting processing unit according to the downlink MAP data defined by the bandwidth allocation control unit 36. When receiving the uplink burst from the wireless terminal 4, the control unit 41 controls the receiving processing unit according to the uplink MAP data defined by the bandwidth allocation control unit 36.

Figure 13:
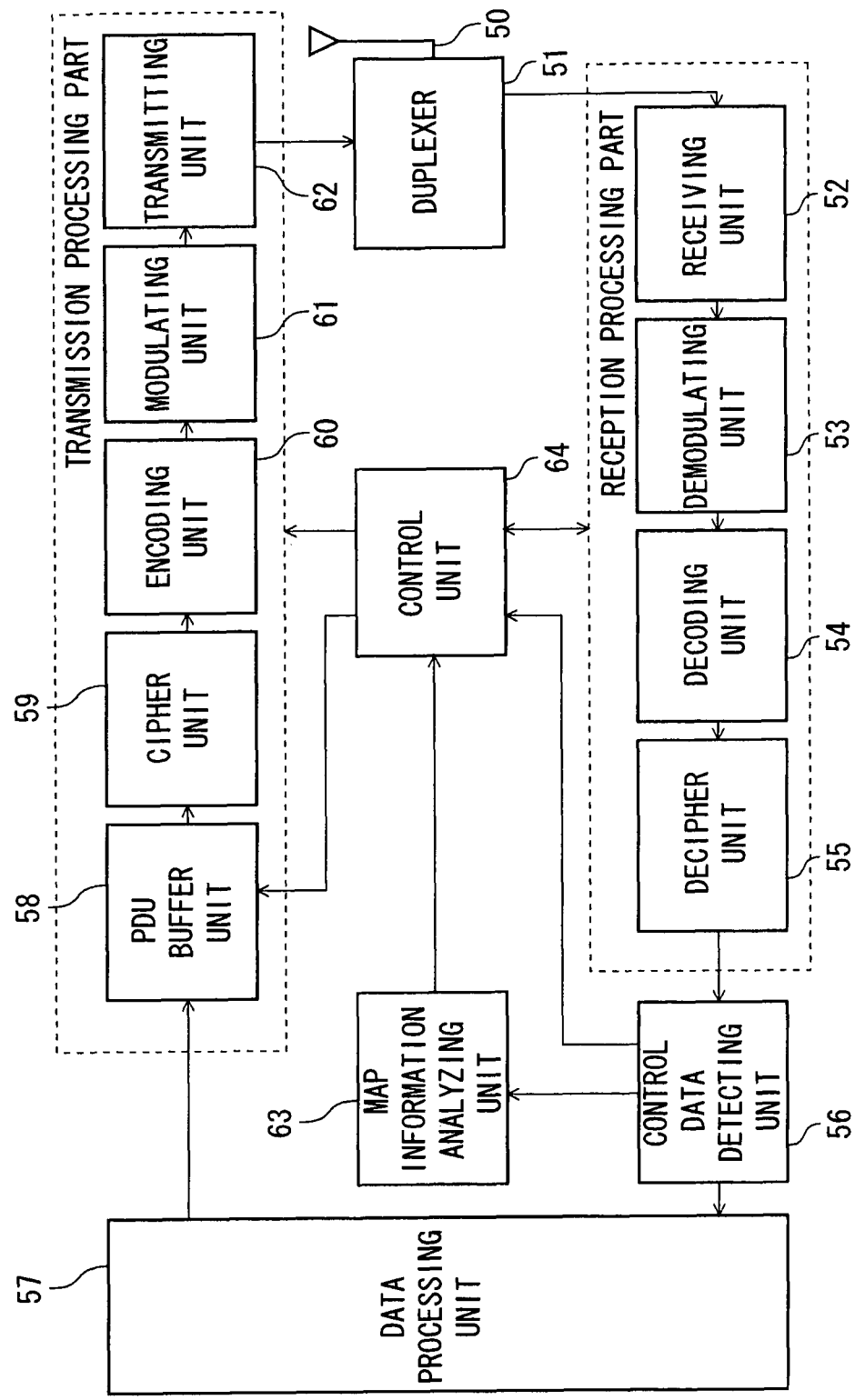
FIG. 13 shows a wireless terminal (4).

FIG. 13 shows a diagram showing a configuration of the wireless terminal 4.

As shown in FIG. 13, numeral 50 indicates an antenna for transmitting/receiving wireless signals to/from the relay station 3 and the wireless base station 2. Numeral 51 indicates a duplexer for sharing the antenna 50 for transmission and reception. Numeral 52 indicates a receiving unit. Numeral 53 indicates a demodulating unit to demodulate received signals. Numeral 54 indicates a decoding unit to decode the demodulated received signals. Numeral 55 indicates a decipher unit to perform decipher processing on the ciphered data of the decoded data.

The control data detecting unit 56 detects control data and gives the control data to a MAP information analyzing unit 63 if the control data is the MAP data. Other control data is given to a control unit 64. The user data or the like are given to a data processing unit 57.

Numeral 63 indicates a MAP information analyzing unit. The MAP information analyzing unit 63 analyzes the MAP data (downlink and uplink communication parameter (B)) received from the wireless base station 2 or the relay station 3 and gives the analysis result to the control unit 64. That is, the MAP information analyzing unit 63 notifies the control unit 64 of the transmit/receive timing of each data.

Numeral 57 indicates a data processing unit. The data processing unit 57 performs display processing of each data included in the received data and processing of audio output or the like and gives the user data, which needs to be transmitted to the destination device, to a PDU buffer unit 58.

Numeral 58 indicates a PDU buffer unit. The PDU buffer unit 58 outputs the stored data to a cipher unit 59 such a way that the transmit data from the data processing unit 57 can be transmitted at the transmit timing, on the transmit channel, and by the wireless communication method, which are specified by the MAP data (communication parameter (B)).

The cipher unit 59 performs cipher processing on payload parts or the like of the MAC PDU comprised of the subheader, the user data or the like, and gives the result to an encoding unit 60. As well as the wireless base station 2, the PDU buffer unit 58 is deemed to be provided with a ciphering function, so that the data can be added with the MAC header or the like after being ciphered.

Numeral 60 indicates an encoding unit. Numeral 61 indicates a modulating unit. The encoding processing and the demodulating processing are performed on the transmit data under control of the control unit 64 such a way that the transmit data from the PDU buffer unit 58 is transmitted at the transmit timing, and on the transmit channel, which are specified by the MAP information.

The transmitting unit 62 transmits wireless signals through the antenna 50.

The control unit 64 controls operations of the transmitting processing unit and the receiving processing unit based on the MAP data.

"Bandwidth Request"

Next, description is made of the processing of requesting uplink transmission bandwidth by the wireless terminal 4 based on the above described system.

In this case, the bandwidth allocation control is performed by the bandwidth allocation control unit 36 of the relay station 3 when the relay station 3 receives the bandwidth request from the wireless terminal 4. For example, the transmission area for data transmission of the wireless terminal 4 is defined by the UL MAP data transmitted from the relay station 3 to the wireless terminal 4-2 in order to permit the transmission. Accordingly, delay of the processing is prevented because the bandwidth allocation request can be responded without inquiry to the wireless base station 2.

Furthermore, the bandwidth allocation is performed by the bandwidth allocation control unit 36 of the relay station 3 without inquiry to the wireless base station 2 if the bandwidth allocation request from the wireless terminal 4 can be analyzed without inquiry to the wireless base station 2.

However, if the bandwidth allocation request from the wireless terminal 4 can not be analyzed without inquiry to the wireless base station 2 (e.g., if the data necessary for the bandwidth allocation is ciphered by the cipher communication between the wireless base station 2 and the wireless terminal 4), the relay station 3 transfers the ciphered data to the wireless base station 2 and receives data (bandwidth request information) necessary for the bandwidth allocation, wherein the data is generated by the wireless base station 2 with deciphering the ciphered data. The bandwidth allocation control unit 36 allocates the bandwidth to the wireless terminal 4 based on the obtained data (bandwidth request information).

As a result, a ciphered communication is performed between the wireless base station 2 and the wireless terminal 4 and the relay station can obtain the deciphered result even if the ciphered data can not be deciphered by the relay station 3 itself. It is also possible to control the wireless communication with the wireless terminal 4 based on the deciphered result.

Detailed description is made with reference to the figure.

Figure 14:
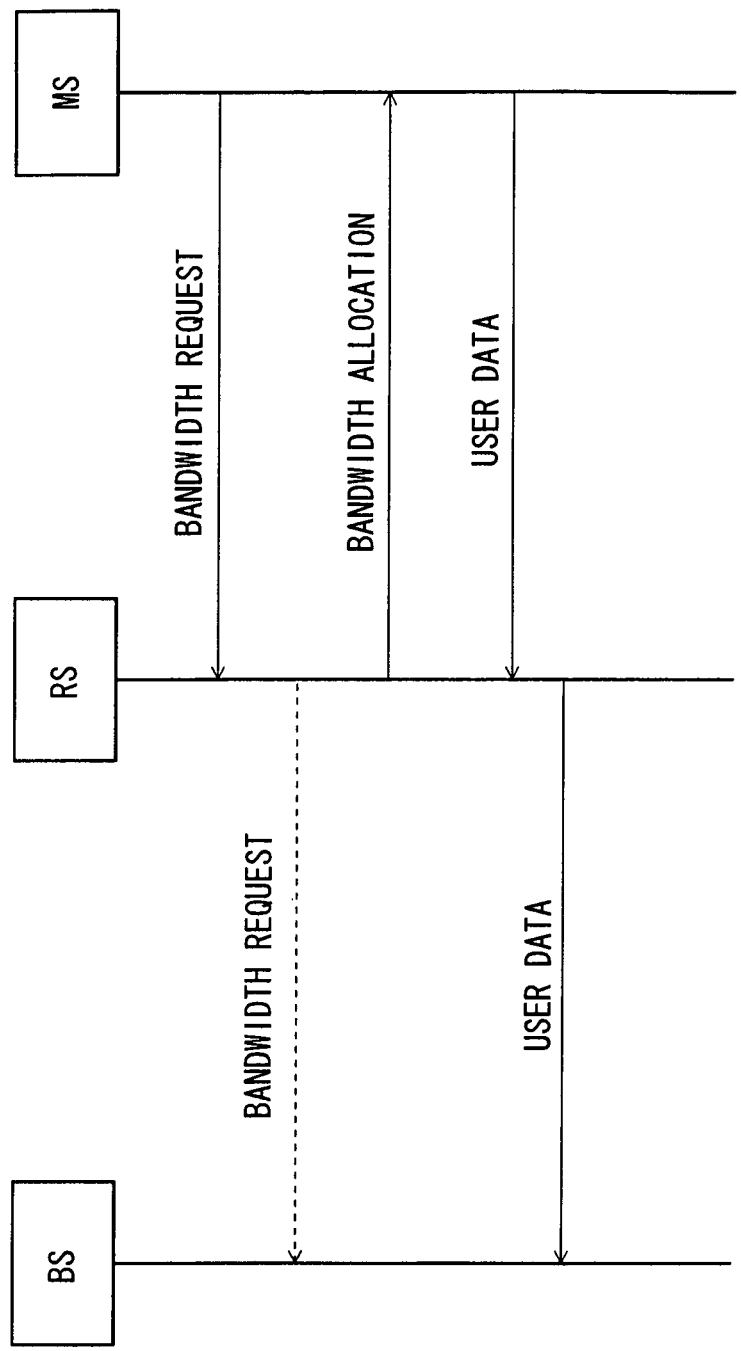
FIG. 14 shows the bandwidth allocation sequence based on the bandwidth request header.
Figure 15:
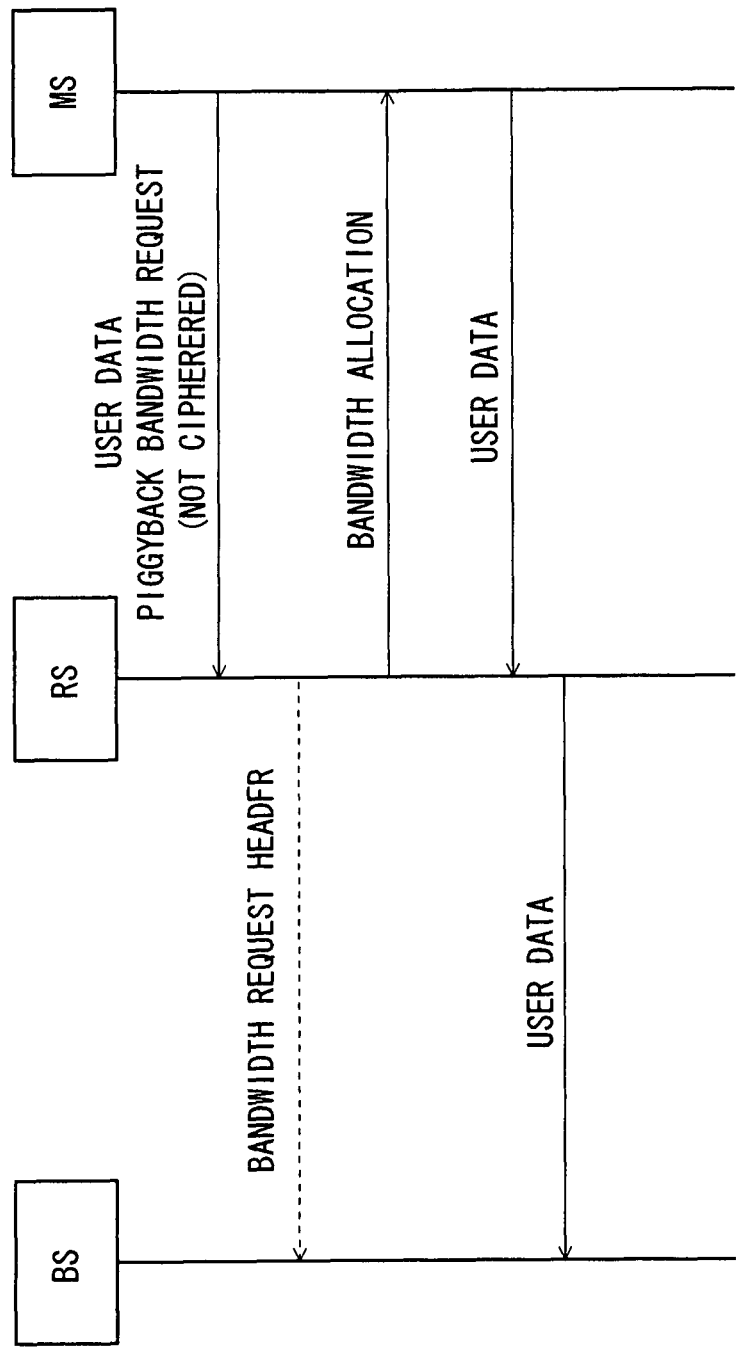
FIG. 15 shows the bandwidth allocation sequence based on a piggyback bandwidth request (non-ciphered).

FIG. 14 shows a sequence of using a bandwidth request header as a bandwidth request from the wireless terminal 4.

As described previously, the bandwidth request header shown in FIG. 6 is a simple message which is not ciphered and includes no payload. This bandwidth request header is transmitted, for example, when the wireless terminal 4 which has conducted the network entry by the initial ranging procedure.

As shown in FIG. 14, the wireless terminal 4 (MS) transmits a bandwidth request (a bandwidth request header).

In advance of this transmission, a bandwidth request ranging signal can be transmitted to secure the transmission area of this bandwidth request header. That is, the relay station 3 generates the MAP data by the bandwidth allocation control unit 36 to secure a predetermined bandwidth and transmits the MAP data to the wireless terminal 4 (4-2) by receiving the bandwidth request ranging signal.

However, the transmission of the bandwidth request ranging signal is not essential. Because the transmission area for permitting the transmission of the bandwidth request (the bandwidth request header) to the wireless terminal 4 is periodically conducted depending on the type of QoS, the bandwidth request (the bandwidth request header) can be transmitted by using this transmission area.

When the relay station 3 (RS) receives the bandwidth request header from the wireless terminal 4, the non-ciphered data detecting unit 35 of the relay station 3 recognizes that the bandwidth request header is not a cipher object because of the EC=0, and then gives the bandwidth request header to the bandwidth allocation control unit 36.

The bandwidth allocation control unit 36 requests the bandwidth which is to be allocated to the wireless terminal 4 based on the information (the bandwidth request type (Type) and the bandwidth request (BR)) included in the bandwidth request header. In order to allocate the bandwidth, the bandwidth allocation control unit 36 generates and gives the MAP data to the buffer unit 37 for transmission of the MAP data. In this case, the maximum bandwidth allocated to the wireless terminal 4 is A+B, for example, when the already requested bandwidth is A, the Type of the bandwidth request header is 000 (incremental bandwidth), and the BR is B. Also, the maximum bandwidth allocated to the wireless terminal 4 is B, for example, when the already requested bandwidth is A, the Type of the bandwidth request header is 001 (aggregate bandwidth), and the BR is B.

The relay station 3 can request the bandwidth (X) which is greater than (or equal to) the bandwidth allocated to the wireless terminal 4 so that the relay station 3 is allocated bandwidth on the uplinks MMR link. For example, the control unit 41 can generate control data requesting the allocation of the bandwidth (X) and give the control data to the buffer unit 37 to transmit the data to the wireless base station 2.

The MAP information analyzing unit 63 of the wireless terminal 4 obtains the transmission area (transmit timing and transmission area) for permitting the transmission of the user data by the MAP data transmitted from the relay station 3, and gives the data to the control unit 64.

The control unit 64 controls the transmitting processing unit to transmit the user data or the like in the transmission area.

The control unit 41 of the relay station 3 recognizes the transmission area allocated to the wireless terminal 4 by the bandwidth allocation control unit 36, so that the control unit 41 controls the receiving processing unit to receive the transmit data such as user data.

The control unit 41 of the relay station 3 can transfer the user data to the wireless base station 2 by giving the received user data to the buffer unit 37 to transmit the data through the MMR link.

As described previously, the control unit 41 can transfer the user data immediately by requesting the wireless base station 2 prior to receiving of the user data to secure the transmission area which is necessary for transfer of the user data.

Obviously, the control unit 41 can generate the control signal and control the transmission in order to secure the transmission area on the uplink MMR link after receiving the user data from the wireless terminal 4.

Next, description is made of an example of performing the bandwidth request from the wireless terminal 4 by using the subheader which may be ciphered (EC=1) or not be ciphered (EC=0) by the cipher unit 59 of the wireless terminal 4. This subheader is one of the subheaders shown in FIG. 4 and is set to #0 for the Type of the MAC header. However, in this example, the EC of the MAC header is set to 0, and the subheader is not ciphered. The whole MAC PDU is shown in FIG. 1 (The payload is not ciphered).

By the control of the control unit 64, the wireless terminal 4 transmits the MAC PDU including the user data (can be omitted) and the subheader (the subheader including the piggyback bandwidth request in the second or third from the top in FIG. 4, or the subheader in the top in FIG. 4), which are not given the processing of the cipher that can not be read by the relay station 3. This transmission area of the MAC PDU can be allocated periodically and also can be obtained by transmitting the bandwidth request ranging signal.

The non-ciphered data detecting unit 35 of the relay station 3 gives the MAC header, the subheader, or the like to the bandwidth allocation control unit 36.

The bandwidth allocation control unit 36 calculates an aggregate bandwidth (favorably same as the aggregate bandwidth or, maybe more) based on the piggyback bandwidth request of the subheader on the CID notified by the MAC header and then allocates the corresponding transmission area (bandwidth) to the wireless terminal 4 up to the calculated value. That is, the bandwidth allocation control unit 36 generates and gives the UL MAP data defining the transmission area to the buffer unit 37. At this time, as well as described previously, requesting the transmission area of the user data which should be transferred to the wireless base station 2 in a later stage can be performed by transmitting a control signal.

After receiving the UL MAP data from the relay station 3, the wireless terminal 4 controls the control unit 64 to perform the transmission of the user data and the like in the transmission area specified in the UL MAP.

The relay station 3 transfers the uses data received from the wireless terminal 4 to the wireless base station 2 as described previously.

Figure 16:
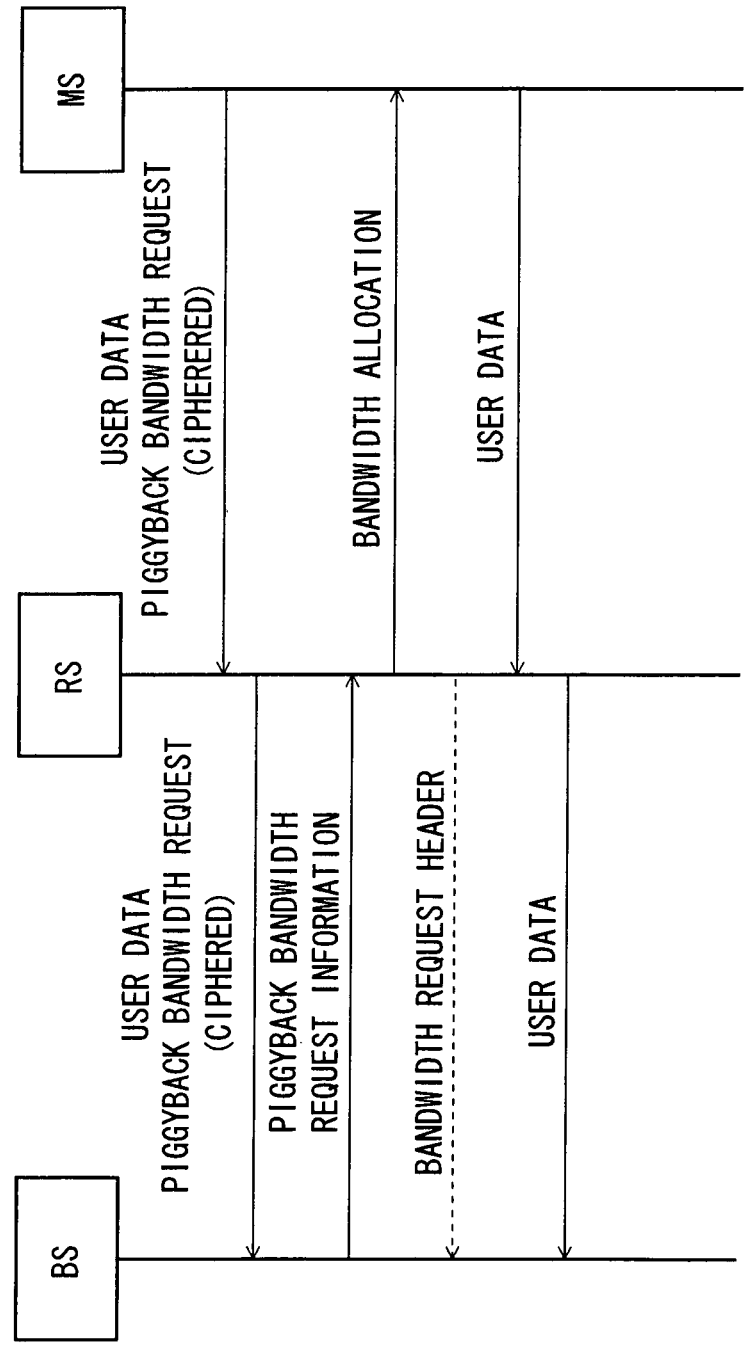
FIG. 16 shows the bandwidth allocation sequence based on the piggyback bandwidth request (ciphered).

Description is made of an example of the bandwidth request from the wireless terminal 4 with reference to FIG. 16 by using the subheader ciphered by the cipher unit 59 of the wireless terminal 4. This subheader is one of the subheaders shown in FIG. 4 and is set to #0 for the Type of the MAC header. However, the EC of the MAC header is set to 1, and the subheader is ciphered. The whole MAC PDU is shown in FIG. 1 (The payload is ciphered).

By the control of the control unit 64, the wireless terminal 4 transmits the MAC PDU including the user data (can be omitted) and the subheader which are ciphered by the cipher unit 59. The ciphered parts of the MAC PDU cannot be recognized by the relay station 3. This transmission area of the MAC PDU can be allocated periodically and also can be obtained by transmitting the bandwidth request ranging signal.

The non-ciphered data detecting unit 35 of the relay station 3 gives the received MAC PDU to the control unit 41 because the payload is ciphered (EC=1). In this case, therefore, the bandwidth allocation control unit 36 does not perform the bandwidth allocation without inquiry to the wireless base station 2.

The relay station 3 gives the MAC PDU including the ciphered payload to the buffer unit 37 and transmits the MAC PDU to the wireless base station 2 through the MMR link. At this time, if necessary, the MAC PDU can be added with a request data which requests the wireless base station to transmit bandwidth request information which is the result (particularly the data related to the bandwidth request) of the decipher processing on the ciphered payload to the relay station 3.

The wireless base station 2 deciphers the MAC PDU including the ciphered payload by the decipher unit 15 and gives the decipher result to the control unit 27. The wireless base station 2 can recognize that the MAC PDU is not directly received, but via the relay station 3 by detecting that the MAC PDU is received at receiving timing of the MMR link or CID is corresponds to the MMR link. The MAC PDU directly received can be given to the bandwidth allocation control unit 20.

Figure 21:
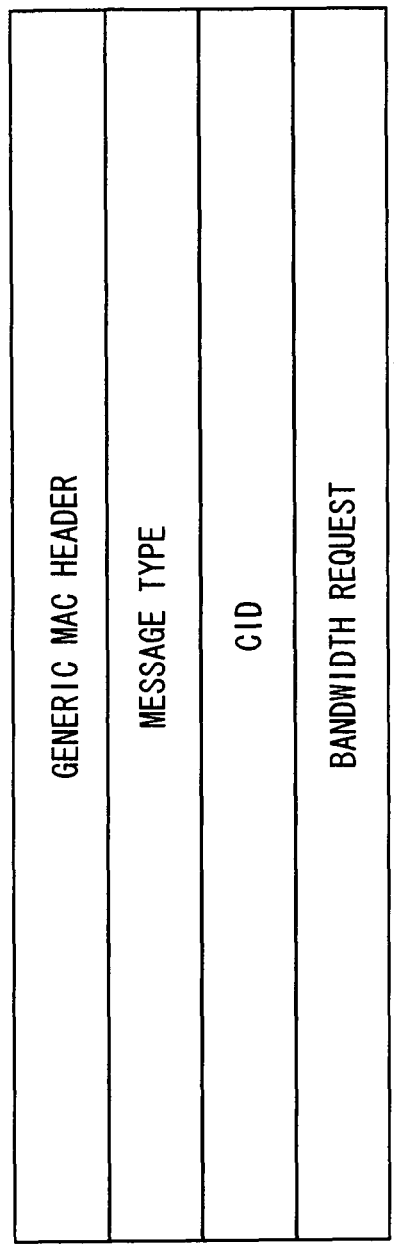
FIG. 21 shows bandwidth request information of the wireless terminal (4).
Figure 22:
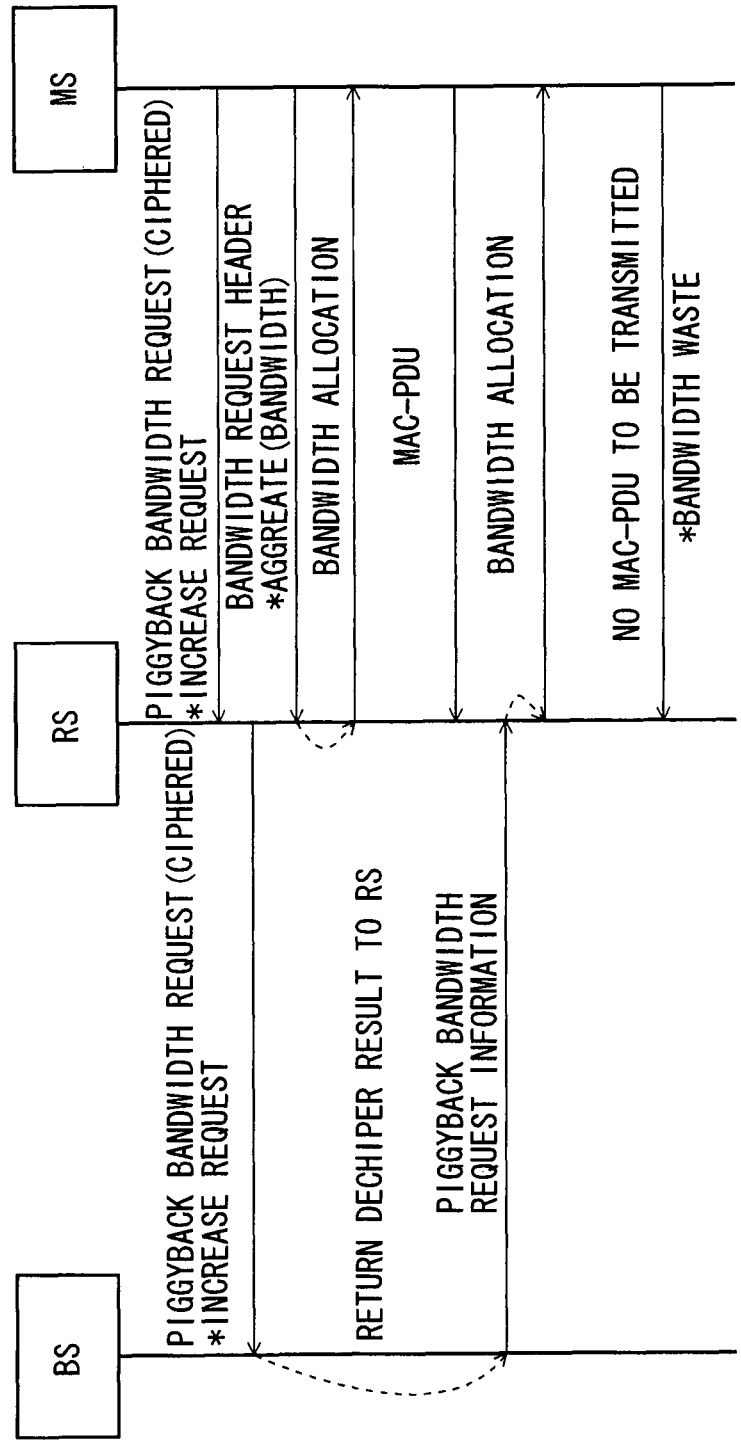
FIG. 22 shows a sequence of the bandwidth request (ciphered).

The bandwidth allocation control unit 20 obtains the deciphered MAC PDU. Thus, the bandwidth request information necessary for the bandwidth allocation at the relay station 3 is returned to the relay station 3 through the MMR link. The CID and the subheader that has been deciphered in the MAC header can be returned. Also, the bandwidth (e.g., an aggregate bandwidth and an incremental bandwidth) requested by the wireless terminal 4 can be returned as the bandwidth request information from the wireless terminal 4. FIG. 21 shows an example. In the example of FIG. 21, the data including the generic MAC header, the MAC header, the type of message (indicating that the bandwidth is an aggregate bandwidth or an incremental bandwidth), the CID, and the requested bandwidth (bandwidth request) is returned to the relay station 3.

After obtaining the bandwidth request information originated from the wireless terminal 4 from the wireless base station 2 through the MMR link, the control unit 41 of the relay station 3 gives the bandwidth which should be allocated to the wireless terminal 4 and the information necessary for the bandwidth allocation of the CID or the like to the bandwidth allocation control unit 36.

Therefore, based on the information given, the bandwidth allocation control unit 36 generates and transmits the MAP data to the wireless terminal 4.

At this time, as well as described previously, requesting the transmission area of the data which should be transferred to the wireless base station 2 in a later stage can be performed by the transmission of the control signal.

The control unit 64 controls a transmitting processing unit such a way that the wireless terminal 4 receiving the UL MAP data from the relay station 3 performs the transmission of the user data within the transmission area specified by the UL MAP data.

As well as described previously, the relay station 3 transfers the user data received from the wireless terminal 4 to the wireless base station 2.

Figure 17:
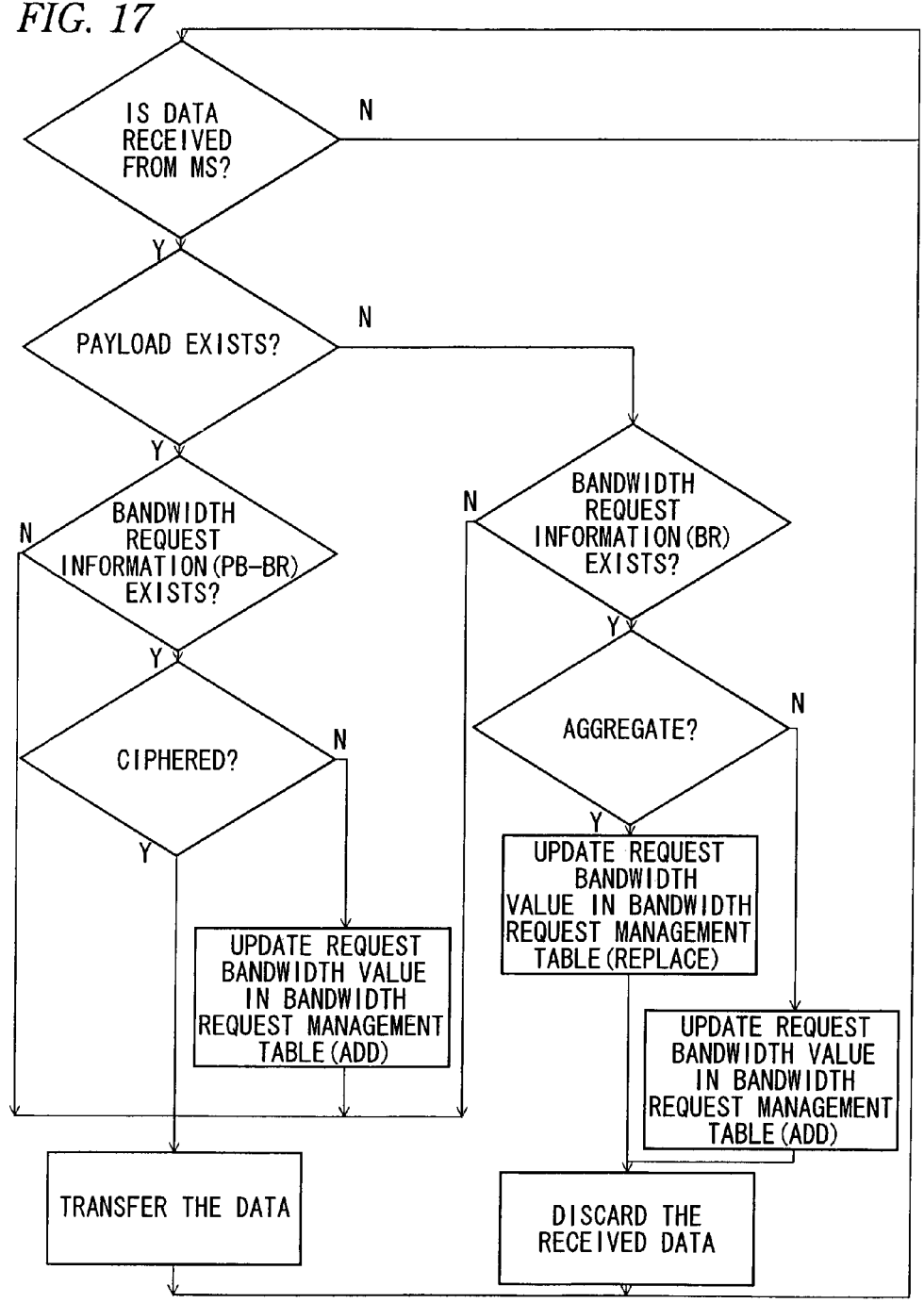
FIG. 17 shows an operation of the relay station (3).

FIG. 17 shows a processing flowchart when the relay station 3 receives the MAC PDU and the bandwidth request header from the wireless terminal 4.

First, it is determined whether or not the relay station 3 receives the data from the wireless terminal 4. If NO, the process goes back to the beginning determination.

If YES, on the other hand, it is determined whether or not there is a payload. If YES at this step, it is determined whether or not the piggyback bandwidth request is included in the received data. If NO in the determination whether or not the piggyback bandwidth request is included, the received data is transferred to the wireless base station 2, and the process goes back to the beginning determination.

If YES in the determination whether or not the piggyback bandwidth request is included, it is determined whether or not the piggyback bandwidth request is ciphered.

If the piggyback bandwidth request is ciphered, the received data is transferred to the wireless base station 2.

On the other hand, if the piggyback bandwidth request is not ciphered, the bandwidth allocation control unit 36 updates request bandwidth values of the bandwidth request management table for managing the values for each CID (In case of "Incremental", the requested bandwidth of the received information is added to the memory value to be updated. In case of "Aggregate", the requested bandwidth in the bandwidth request management table is replaced with the value in the received information). FIG. 20 shows an example of the bandwidth request management table stored in the memory unit. The request bandwidth (e.g., byte unit) is managed in correspondence to the CID to identify the connection with the wireless terminal 4.

After the requested bandwidth value is updated, the received data is transferred to the wireless base station 2.

If NO in the determination whether there is a payload, it is determined whether or not there is bandwidth request information. If NO at this step, the received data is transferred to the wireless base station 2.

If YES, on the other hand, it is determined whether or not the Type of the bandwidth request header is "Aggregate".

If the Type is "Aggregate", the bandwidth allocation control unit 36 replaces the requested bandwidth values of the bandwidth request management table with the bandwidth request in the bandwidth request header and may discard the received data. This is because since there is no payload, there is no need to transfer the user data to the wireless base station 2.

If the Type is "Incremental", the bandwidth allocation control unit 36 updates the requested bandwidth values of the bandwidth request management table (stored in the memory unit) for managing the values for each CID (the bandwidth request in the bandwidth request header is added to the memory value for update) and may discard the received data.

If the relay station 3 has discarded the bandwidth request header, the relay station 3 separately requests the transmission area for transferring the user data or the like to the wireless base station 2. It is apparent that the uplink transmission area of the MMR link can be secured by transmitting the bandwidth request header received from the wireless terminal 4 to the wireless base station 2.

It has been shown how the relay station 3 updates the request bandwidth values of the bandwidth request management table upon receiving the bandwidth request. When the relay station 3 allocates the bandwidth to the wireless terminal 4, the bandwidth request value of the bandwidth request management table is reduced by the amount of the allocation.

Figure 18:
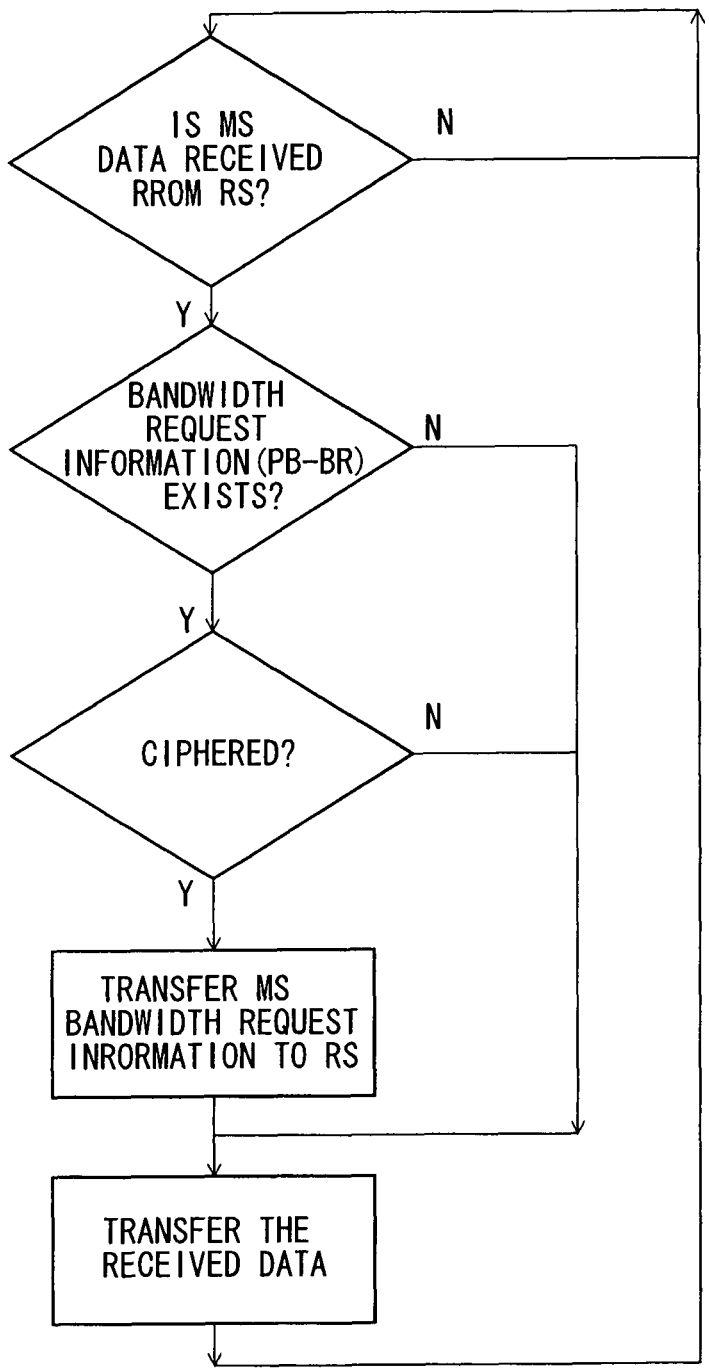
FIG. 18 shows an operation of the wireless base station (2).

FIG. 18 shows a processing flowchart when the wireless base station 2 receives the MAC PDU from the relay station 3.

First, it is determined whether or not the wireless base station 2 receives the data from the relay station 3. If NO, the process goes back to the beginning determination.

If YES, on the other hand, it is determined whether or not there is the bandwidth request (the piggyback bandwidth request) in the received data.

If YES in this step, it is determined whether or not the bandwidth request (piggyback bandwidth request) is ciphered. If the bandwidth request is not ciphered, the processing of transferring the received data to the routing device 1 is performed. If the bandwidth request is ciphered, on the other hand, the decipher processing result given for the ciphered bandwidth request (the piggyback bandwidth request) is returned to the relay station 3 as the bandwidth request information from the wireless terminal 4.

FIG. 21 shows an example of the bandwidth request information of the wireless terminal 4 transmitted from the wireless base station 2 to the relay station 3. A generic MAC header, followed by a message type, a CID indicating a connection requiring a bandwidth allocation, and the bandwidth request (byte unit) are included in the bandwidth request information.

In a message type field "a bandwidth increase" can be set and in a BR (Bandwidth Request) field "the bandwidth increment amount requested by the wireless terminal 4".

Figure 19:
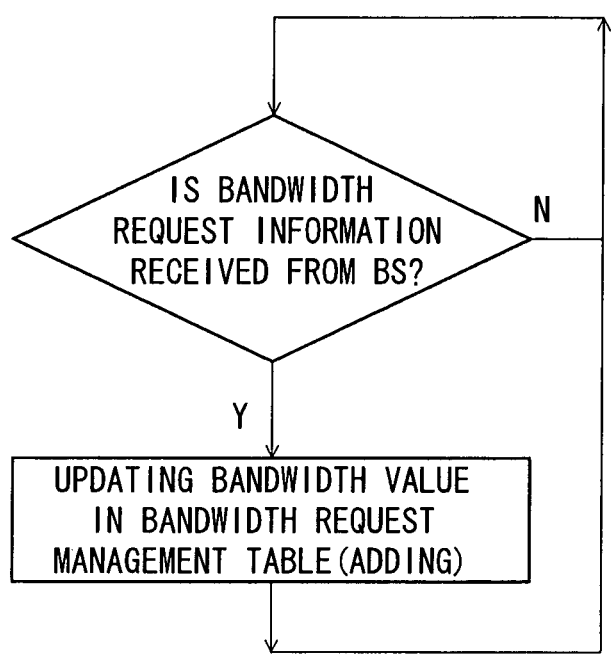
FIG. 19 shows an operation of the relay station (3).

FIG. 19 shows a processing flowchart when the relay station 3 receives the bandwidth request information (FIG. 21) of the wireless terminal 4 from the wireless base station 2.

When receiving the bandwidth request information of the wireless terminal 4 from the wireless base station 2, the relay station 3 updates the bandwidth management table (FIG. 20) which is stored in the memory according to the information.

The relay station 3 allocates the bandwidth to the wireless terminal 4 based on the result values updated in the bandwidth management table. That is, the relay station 3 generates and transmits the UL MAP defining the transmission area corresponding to the updated value. When the relay station 3 allocates the bandwidth to the wireless terminal 4, the bandwidth request value of the bandwidth request management table is reduced by the amount of the allocation.

[b] Embodiment 2

Next, description is made of the case when the wireless terminal 4 transmits the bandwidth request in order to obtain the bandwidth for transmission of the user data or the like (e.g., the bandwidth request (the bandwidth request header (Aggregate)) is transmitted after (immediately after) the transmission of piggyback bandwidth request (ciphered)).

When a bandwidth increment is requested by the wireless terminal 4 with the piggyback bandwidth request, the relay station 3 is not able to decipher the ciphered piggyback bandwidth request and obtain information. Thus, the relay station 3 transfers the piggyback bandwidth request (ciphered) to the wireless base station 2.

Then, the wireless terminal 4 transmits the bandwidth request header in which the aggregate bandwidth is specified. This transmission can be performed because of a periodical transmit timing of bandwidth request or can be performed because the transmission bandwidth needs to be obtained once again if there is no response to the transmitted piggyback bandwidth request.

Since the bandwidth request header (aggregate bandwidth specified) is not ciphered, the bandwidth allocation control unit 36 of the relay station 3 interprets the aggregate bandwidth requested by the wireless terminal 4, replaces the requested bandwidth of the bandwidth request management table corresponding to the CID included in the bandwidth request header with the value of the bandwidth request in the bandwidth request header, and then allocates the bandwidth to the wireless terminal 4. That is, the transmission bandwidth is allocated by the UL MAP data. The relay station 3 reduces the bandwidth request value of the bandwidth request management table by the amount of the allocation.

Therefore, the wireless terminal 4 transmits the MAC PDU including the user data by using the transmission bandwidth specified by the UL MAP data.

After receiving the piggyback bandwidth request (ciphered), the wireless base station 2 performs the decipher processing of the cipher in the decipher unit 15, and the result is obtained by the control unit 27.

Based on the piggyback bandwidth request, the control unit 27 detects the bandwidth increment requested by the wireless terminal 4 and transmits the bandwidth increment to the relay station 3 as the bandwidth request information of the wireless terminal 4. That is, the bandwidth request information is transmitted to the relay station 3 through the downlink MMR link.

The relay station 3 updates the bandwidth of the bandwidth request management table by adding the increment amount and allocates the updated bandwidth to the wireless terminal 4.

However, this allocation would be useless because the wireless terminal 4 has already been allocated the transmission bandwidth and has already sent the user data or the like. Accordingly, the processing flow in the relay station 3 is devised. The flow is shown in FIG. 23 similar to FIG. 17, and the changes (differences) there between is described briefly.

Figure 23:
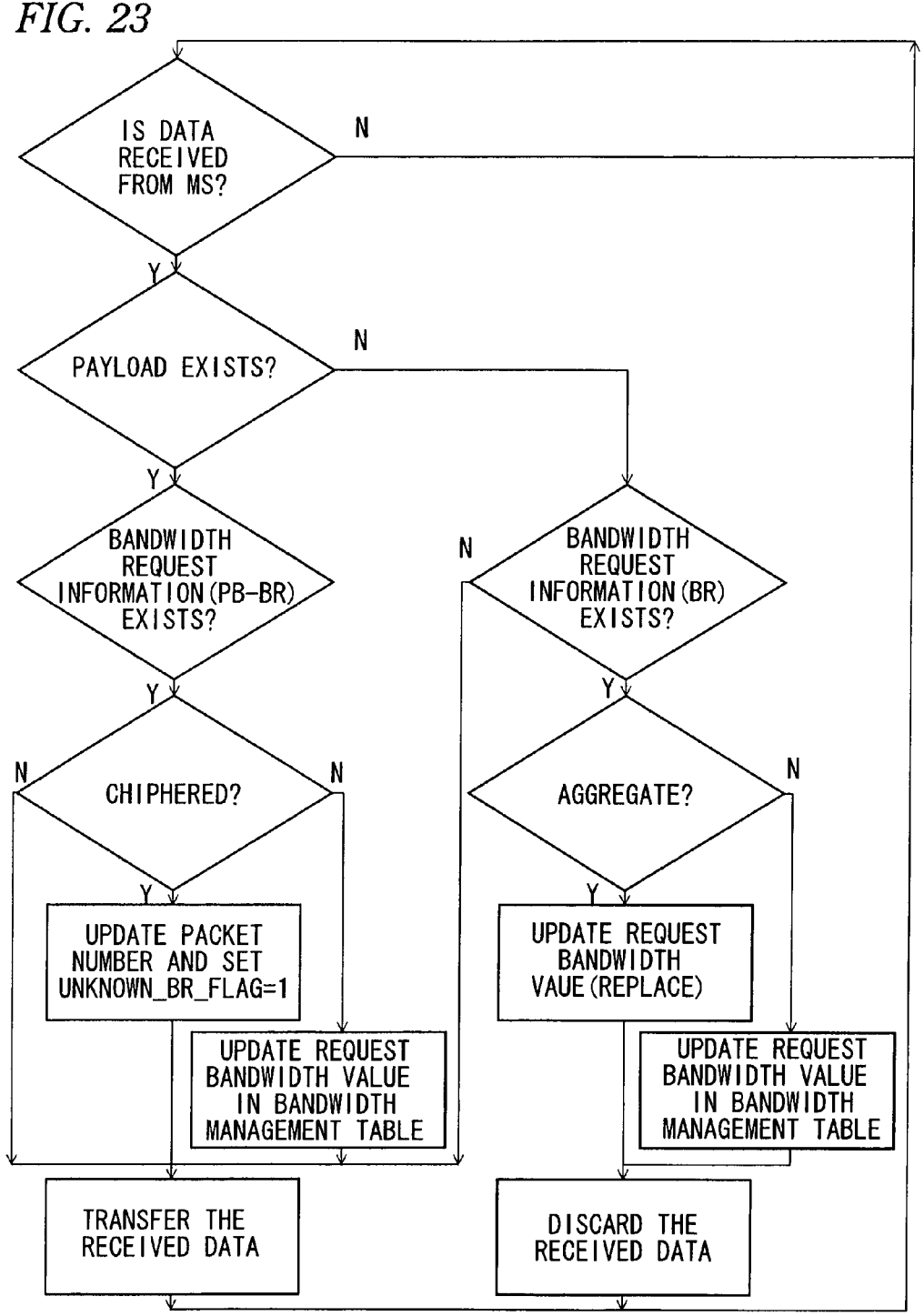
FIG. 23 shows an operation of the relay station (3).

FIG. 23 is changed in that, in FIG. 17, the processing of the case when it is determined that the bandwidth request has he piggyback bandwidth request and this request is ciphered.

That is, one change is that, as well as the packet number of the bandwidth request management table is changed to the packet number of the received MAC PDU, the transfer of the received data is performed after an unknown bandwidth request flag is set to 1. The unknown bandwidth request flag=1 indicates that the wireless terminal 4 performs the bandwidth request that is not recognized by the relay station 3, which means that the bandwidth request information of the wireless terminal 4 is transferred from the wireless base station 2.

Another change is that, upon receiving a bandwidth request header specifying "Aggregate", as well as the request bandwidth value of the bandwidth request management table is replaced by the aggregate bandwidth, the unknown bandwidth flag is set to 0. In this case, the unknown bandwidth request flag=0 indicates that the request bandwidth is set to the latest value.

FIG. 25 shows an example of the bandwidth request management table having two additional rows of the unknown bandwidth request flag and the packet number.

Figure 26:
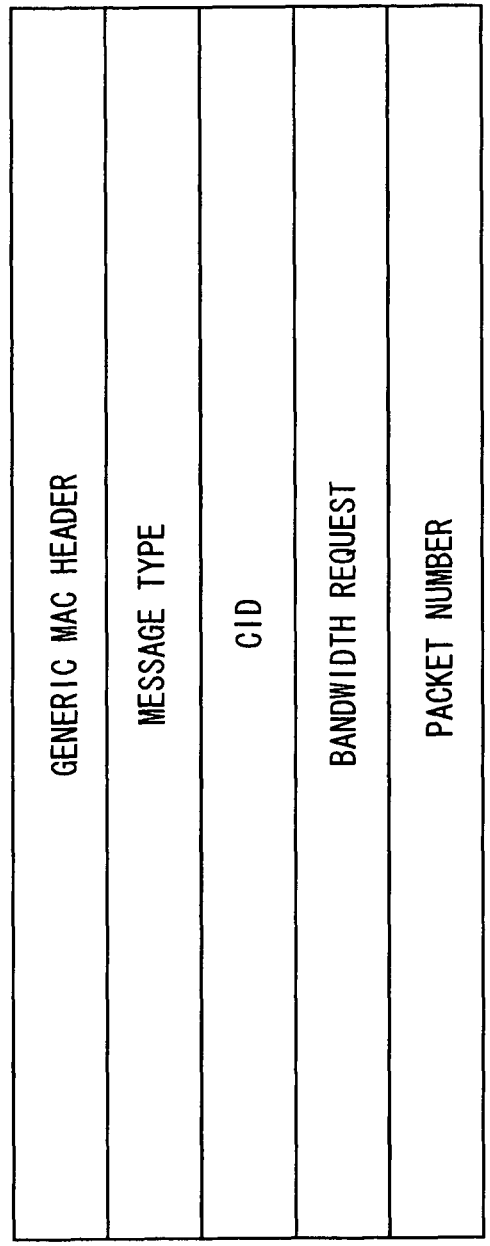
FIG. 26 shows the bandwidth request information of the wireless terminal (4).

The processing flowchart of receiving the data from the relay station 3 by the wireless base station 2 is identical to that of FIG. 18. However, the bandwidth, request information of the wireless terminal 4 transmitted to the relay station 3 from the wireless base station 2 is added with the packet number included in the ciphered MAC PDU (see FIG. 26).

Figure 24:
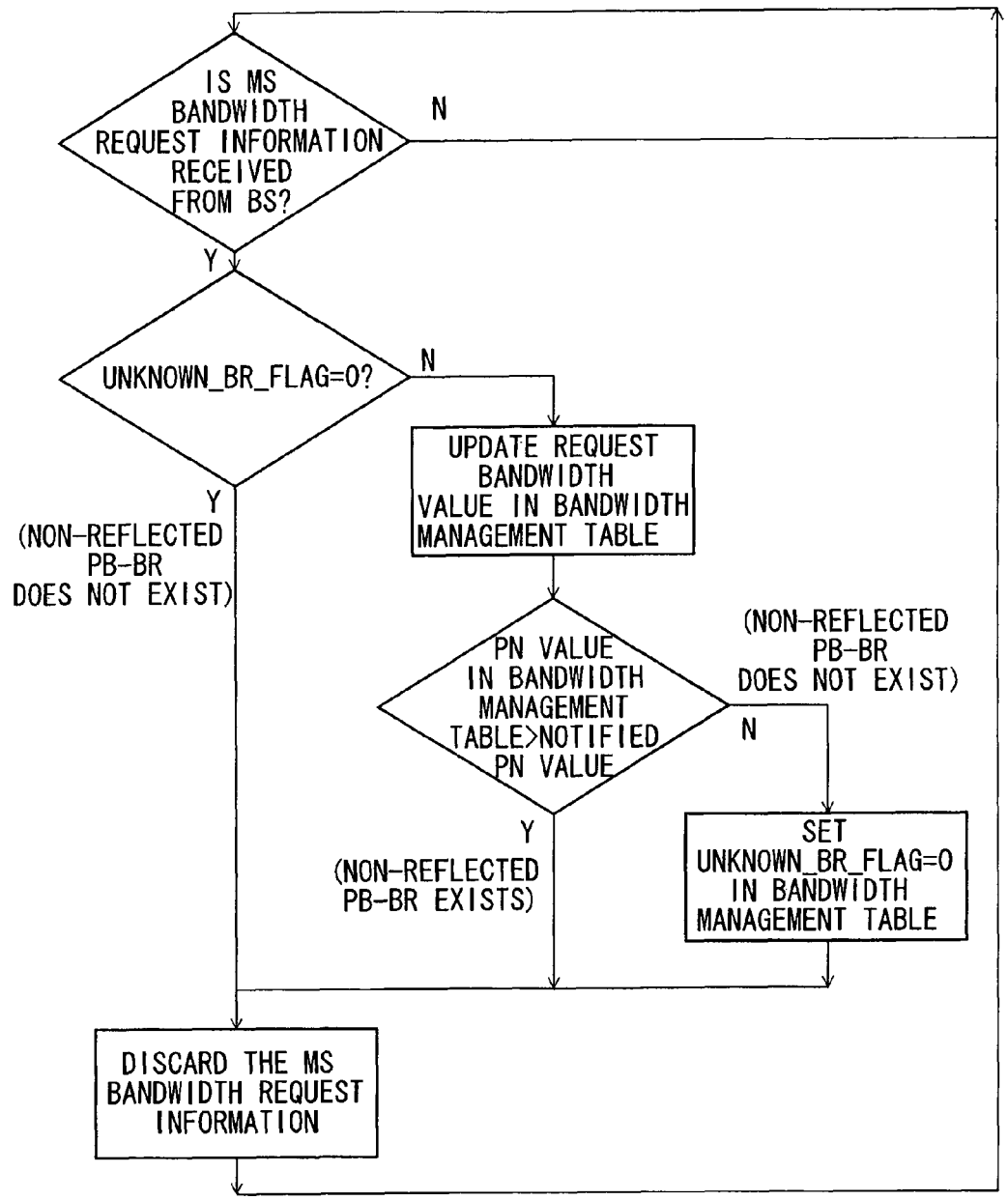
FIG. 24 shows an operation of the relay station (3).

FIG. 24 shows a flowchart of the operation of the relay station 3 in case of receiving the bandwidth request information of the wireless terminal 4 from the wireless base station 2.

The relay station 3 determines whether or not the bandwidth request information of the wireless terminal 4 is received from the wireless base station 2. If NO, the process goes back to the beginning determination.

If YES, on the other hand, it is determined whether or not the unknown bandwidth request flag is set to 0 in the record of the corresponding CID.

If the flag is set to 0 at this time, the requested bandwidth in the bandwidth request management table has already been updated according to the latest bandwidth request header (aggregate) from the wireless terminal 4. Thus, the bandwidth request information of the wireless terminal 4 is discarded, and the process goes back to the beginning determination.

If the flag is set to 1, on the other hand, the request bandwidth value of the bandwidth request management table is updated accordingly.

Then, it is determined whether or not the packet number of the bandwidth request management table is greater than the packet number informed by the wireless base station 2 in order to determine to perform the processing of maintaining or updating the set value of the unknown bandwidth request flag.

If YES at this step, the set value of the unknown bandwidth request flag is maintained. If NO, the value of the unknown bandwidth request flag of the of the bandwidth request management table is updated to 0, and the bandwidth request information of the wireless terminal 4 is discarded. Packet numbers are used in this example, but other information is also applicable. For example, it is possible to use the information which can determine an order of transmission of the bandwidth request of a frame number or the like.

[c] Embodiment 3

If the CID belongs to the UGS class, the grant management subheader does not include a piggyback bandwidth request but a polling request (Poll-Me Bit (PM bit)). If the PM bit included, the wireless terminal 4 can allocate the bandwidth as much as possible to transmit the bandwidth request header.

In this embodiment, the bandwidth allocation control unit 36 of the relay station 3 manages to decide which QoS class the connection (CID) allocated to the wireless terminal 4 belongs to (UGS connection or other connection). It is also possible to decide which QoS class the connection belongs to by monitoring the data transmitted/received between the wireless terminal 4 and the wireless base station 2. For example, when the wireless base station 2 notifies the wireless terminal 4 through the relay station 3 of the QoS class corresponding to the CID, the relay station 3 obtains the notification and stores a corresponding table of CID and QoS class in the memory.

Figure 27:
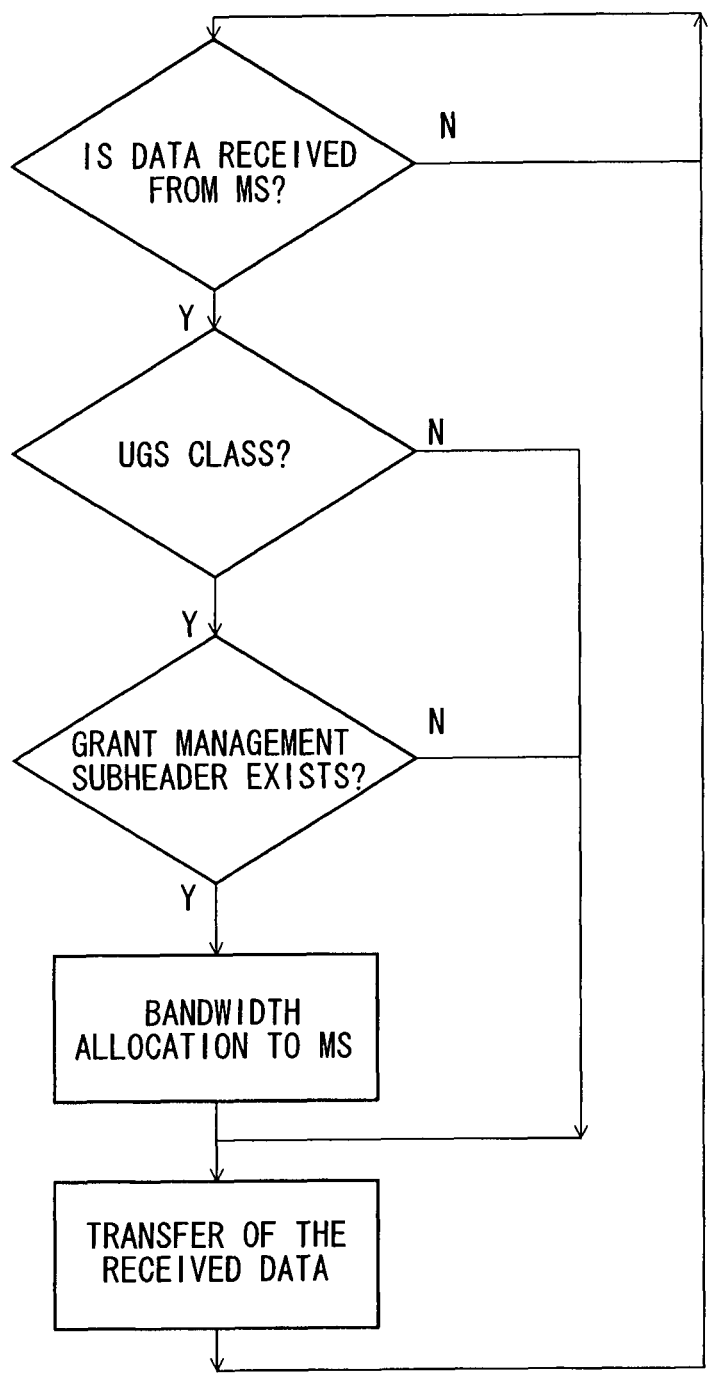
FIG. 27 shows an operation of the relay station (3).

Therefore, as shown in FIG. 27, it is determined whether or not the relay station 3 receives the data. If NO, the process goes back to the beginning determination.

If YES, on the other hand, it is determines whether or not the CID in the header corresponds to the UGS class. In this determination, the corresponding table of CID and QoS class, which is stored in the memory, is referred to search for the QoS class corresponding to the CID included in the data received from the wireless terminal 4.

As a result of the search, the received data is simply transferred to the wireless base station 2 if the CID does not correspond to the UGS class.

As a result of the search, if the CID corresponds to the UGS class, the relay station 3 interprets the Type field of the MAC header which is not ciphered in order to determine whether or not the grant management subheader is present. That is, it is determined whether or not the bit#0 of the type field of the header is set to 1, which indicates a grant management subheader presence.

If NO at this step, the received data is transferred to the base station 2.

If YES, on the other hand, the predetermined bandwidth is allocated as much as possible to transmit the bandwidth request header, and the received data is transferred to the wireless base station 2.

As a result, although the subheader itself is ciphered and may not be interpreted, it is possible to detect that the wireless terminal 4 requests the predetermined bandwidth by the detection of the QoS class by the CID and the subheader type information of the MAC header. This makes it possible to allocate the bandwidth to the wireless terminal 4 more quickly (without inquiry to the wireless base station 2).

According to the above mentioned embodiments, it is possible to provide the relay station 3 with a bandwidth allocation function.

According to the above mentioned embodiments, the content of the data ciphered between the wireless terminal 4 and the wireless base station 2 can be interpreted in the relay station.

According to the above mentioned embodiments, it is possible to prevent the relay station 3 from performing unnecessary bandwidth allocations.

According to the above mentioned embodiments, the relay station 3 can perform an appropriate bandwidth allocation control.

What is claimed is:

1. A relay station that performs relay processing of data, intervening between a wireless terminal and a wireless base station, the relay station comprising:
    a transmitter to transmit an encrypted bandwidth request received from the wireless terminal to the wireless base station, the encrypted bandwidth request being generated by the wireless terminal by encrypting an original bandwidth request;
    a receiver to receive the original bandwidth request that is obtained by the wireless base station by decrypting the encrypted bandwidth request, from the wireless base station; and
    a controller to allocate a bandwidth to the wireless terminal based on the original bandwidth request from the wireless base station.

2. The relay station according to claim 1, further comprising a detector to detect the presence of the original bandwidth request included in the encrypted bandwidth request without decrypting, wherein the controller allocates a bandwidth to the wireless terminal based on the presence of the original bandwidth request detected by the detector.

3. The relay station according to claim 2, wherein the controller controls not to perform the bandwidth allocation based on the original bandwidth request from the wireless base station if a bandwidth allocation is performed based on the presence of the original bandwidth request detected by the detector after transmitting the encrypted bandwidth request to the wireless base station.

4. The relay station according to claim 1, wherein the relay station is not capable of decrypting.

5. The relay station according to claim 1, wherein the original bandwidth request includes information relating bandwidth which is requested for transmission from the wireless terminal.

6. A wireless base station for communicating with a wireless terminal through a relay station, the wireless base station comprising:
    a receiver to receive an encrypted bandwidth request from the wireless terminal via the relay station, the encrypted bandwidth request being generated by the wireless terminal by encrypting an original bandwidth request;
    a decrypting unit to obtain the original bandwidth request by decrypting the encrypted bandwidth request; and
    a transmitter to transmit the original bandwidth request that is obtained by the decrypting unit.

7. The wireless base station according to claim 6, wherein the original bandwidth request includes identification information of the encrypted bandwidth request.

8. A bandwidth allocation method of a relay station that performs relay processing of data, intervening between a wireless terminal and a wireless base station, the bandwidth allocation method comprising:
    transmitting, by the relay station an encrypted bandwidth request received from the wireless terminal to the wireless base station, the encrypted bandwidth request being generated by the wireless terminal by encrypting an original bandwidth request;
    receiving by the relay station a the original bandwidth request which is generated by the wireless base station by decrypting the encrypted bandwidth request; and
    allocating a bandwidth to the wireless terminal based on the original bandwidth request.

9. A relay station that performs relay processing of data, intervening between a wireless terminal and a wireless base station, the relay station comprising:
- a transmitter to transmit an encrypted bandwidth request received from the wireless terminal, to the wireless base station, the encrypted bandwidth request being generated by the wireless terminal by encrypting an original bandwidth request;
- a receiver to receive the original bandwidth request that is obtained by the wireless base station by decrypting the encrypted bandwidth request; and
- a controller to control the transmitter to transmit allocation information of a predetermined bandwidth to the wireless terminal before receiving the decrypted bandwidth request, when the encrypted bandwidth request received from the wireless terminal belongs to a certain connection and when it is detected that a data type included in the encrypted bandwidth request belongs to a predetermined type.

10. A bandwidth allocation method of a relay station that performs relay processing of data, intervening between a wireless terminal and a wireless base station, the bandwidth allocation method comprising:
- transmitting an encrypted bandwidth request received from the wireless terminal, by way of the relay station to the wireless base station, the encrypted bandwidth request being generated by the wireless terminal by encrypting an original bandwidth request;
- receiving by the relay station a decrypted bandwidth request from the wireless base station, wherein the decrypted bandwidth request is generated by the wireless base station by decrypting the encrypted bandwidth request;
- allocating a predetermined bandwidth to the wireless terminal before receiving the decrypted bandwidth request, when the encrypted bandwidth request received from the wireless terminal belongs to a certain connection and when it is detected that a data type included in the encrypted bandwidth request belongs to a predetermined-type; and
- transmitting allocation information of the predetermined bandwidth to the wireless terminal.

\* \* \* \* \*